US008881482B2

(12) United States Patent
Cerny et al.

(10) Patent No.: US 8,881,482 B2
(45) Date of Patent: *Nov. 11, 2014

(54) MODULAR FLOORING SYSTEM

(75) Inventors: Ronald N. Cerny, Park City, UT (US);
Dana Hedquist, West Jordan, UT (US);
Gary L. Day, Bountiful, UT (US)

(73) Assignee: Connor Sport Court International, LLC, Salt Lake City, UT (US)

(*) Notice: Subject to any disclaimer, the term of this patent is extended or adjusted under 35 U.S.C. 154(b) by 74 days.

This patent is subject to a terminal disclaimer.

(21) Appl. No.: 13/544,241

(22) Filed: Jul. 9, 2012

(65) Prior Publication Data

US 2013/0167458 A1    Jul. 4, 2013

Related U.S. Application Data

(63) Continuation-in-part of application No. 12/774,487, filed on May 5, 2010, now Pat. No. 8,683,769.

(60) Provisional application No. 61/297,510, filed on Jan. 22, 2010.

(51) Int. Cl.
| | | |
|---|---|---|
| *E04F 15/10* | (2006.01) | |
| *E04F 15/02* | (2006.01) | |
| *E01C 5/00* | (2006.01) | |
| *E01C 13/00* | (2006.01) | |
| *E04B 5/02* | (2006.01) | |

(52) U.S. Cl.
CPC ..... *E04F 15/02038* (2013.01); *E04F 15/02161* (2013.01); *E04F 15/10* (2013.01); *E04B 5/02* (2013.01); *E01C 5/001* (2013.01); *E01C 13/00* (2013.01); *E04F 2201/0138* (2013.01); *E04F 2201/095* (2013.01)
USPC ............. 52/582.2; 52/570; 52/403.1; 52/263; 52/126.5

(58) Field of Classification Search
CPC ............... E04F 15/10; E04B 5/02; E04B 1/38
USPC ............... 52/846, 790.1, 800.1, 798.1, 584.1, 52/582.2, 582.1, 562, 570, 571, 403.1, 52/480, 481.1, 126.1, 126.5, 126.6, 126.7, 52/263, 127.12, 127.6, 262; 403/381, 364; 472/92, 136; 404/36, 40
See application file for complete search history.

(56) References Cited

U.S. PATENT DOCUMENTS

| | | |
|---|---|---|
| 69,297 A | 9/1867 | Stafford |
| 321,403 A | 6/1885 | Underwood |

(Continued)

FOREIGN PATENT DOCUMENTS

| | | |
|---|---|---|
| CN | 2221623 | 6/1996 |
| EP | 0044371 | 1/1982 |

(Continued)

OTHER PUBLICATIONS

Synthetic Floor Tile; pp. 1-254 Synthetic Floor Tile; pp. 1-88.

(Continued)

*Primary Examiner* — Phi A

(74) *Attorney, Agent, or Firm* — Thorpe North & Western LLP

(57) ABSTRACT

A modular flooring system includes a plurality of floor tiles situated about a ground surface, with each floor tile having a substantially-flat top surface and a connection interface with opposing engagement surfaces. The flooring system also includes a plurality of removable bridge connectors, with each of the bridge connectors having a plurality of tile interfaces, and with each tile interface having complimentary engagement surfaces configured to engage with the opposing engagement surfaces of the connection interfaces. The tile interfaces of the bridge connectors couple to the respective connection interfaces of any adjacent floor tiles to restrain the relative vertical movement between the adjacent floor tiles while facilitating controlled relative lateral movement between the floor tiles.

17 Claims, 23 Drawing Sheets

(56) References Cited

U.S. PATENT DOCUMENTS

| | | | |
|---|---|---|---|
| 658,868 A | 10/1900 | Rosenbaum | |
| 1,177,231 A | 3/1916 | Carter | |
| 1,195,289 A | 8/1916 | Stevens | |
| 1,896,957 A | 2/1933 | Hutcheson | |
| 2,082,563 A | 6/1937 | Bauer | |
| 2,453,221 A * | 11/1948 | Haden | 52/461 |
| 2,653,525 A | 9/1953 | Sargeant | |
| 2,680,698 A | 6/1954 | Schnee | |
| 2,810,672 A | 10/1957 | Taylor | |
| 3,015,136 A | 1/1962 | Doe | |
| 3,122,073 A | 2/1964 | Masse | |
| 3,251,076 A | 5/1966 | Burke | |
| 3,438,312 A | 4/1969 | Becker et al. | |
| 3,531,902 A | 10/1970 | Costa | |
| 3,614,915 A | 10/1971 | Perry | |
| 3,717,247 A | 2/1973 | Moore | |
| 3,735,988 A | 5/1973 | Palmer et al. | |
| 3,775,918 A | 12/1973 | Johnson | |
| 3,778,956 A * | 12/1973 | Martin | 52/584.1 |
| 3,795,180 A | 3/1974 | Larsen | |
| 3,802,144 A | 4/1974 | Spica | |
| 3,909,996 A | 10/1975 | Ettlinger et al. | |
| 3,922,409 A | 11/1975 | Stark | |
| 3,925,946 A | 12/1975 | Balinski et al. | |
| 3,946,529 A | 3/1976 | Chevaux | |
| 4,008,548 A | 2/1977 | Leclerc | |
| 4,018,025 A | 4/1977 | Collette | |
| 4,054,987 A | 10/1977 | Forlenza | |
| 4,118,892 A | 10/1978 | Nakamura et al. | |
| 4,133,481 A | 1/1979 | Bennett | |
| 4,167,599 A | 9/1979 | Nissinen | |
| D255,744 S | 7/1980 | Dekko | |
| 4,226,060 A | 10/1980 | Sato | |
| 4,226,064 A | 10/1980 | Kraayenhof | |
| 4,287,693 A | 9/1981 | Collette | |
| 4,361,614 A | 11/1982 | Moffitt, Jr. | |
| 4,430,837 A | 2/1984 | Kirschenbaum | |
| 4,436,779 A | 3/1984 | Menconi et al. | |
| D274,948 S | 7/1984 | Swanson et al. | |
| 4,468,910 A | 9/1984 | Morrison | |
| 4,478,901 A | 10/1984 | Dickens et al. | |
| 4,478,905 A | 10/1984 | Neeley, Jr. et al. | |
| 4,497,858 A | 2/1985 | Dupont et al. | |
| 4,509,930 A | 4/1985 | Schweigert et al. | |
| 4,526,347 A | 7/1985 | McLoughlin | |
| 4,558,544 A * | 12/1985 | Albrecht et al. | 52/126.6 |
| 4,577,448 A | 3/1986 | Howorth | |
| 4,578,910 A * | 4/1986 | Germeroth et al. | 52/105 |
| 4,584,221 A | 4/1986 | Kung | |
| 4,590,731 A | 5/1986 | DeGooyer | |
| 4,596,729 A | 6/1986 | Morrison | |
| D286,575 S | 11/1986 | Saunders | |
| 4,640,075 A | 2/1987 | Nuncio | |
| 4,648,592 A | 3/1987 | Harinishi | |
| 4,681,786 A | 7/1987 | Brown | |
| 4,694,627 A | 9/1987 | Omholt | |
| 4,702,048 A | 10/1987 | Millman | |
| 4,715,743 A | 12/1987 | Schmanski | |
| 4,727,697 A | 3/1988 | Vaux | |
| 4,728,468 A | 3/1988 | Duke | |
| 4,749,302 A | 6/1988 | DeClute | |
| 4,766,020 A | 8/1988 | Ellingson, Jr. | |
| 4,807,412 A | 2/1989 | Frederiksen | |
| 4,819,932 A | 4/1989 | Trotter | |
| 4,826,351 A | 5/1989 | Haberhauer et al. | |
| 4,835,924 A * | 6/1989 | Blacklin et al. | 52/263 |
| 4,849,267 A | 7/1989 | Ward et al. | |
| 4,860,510 A | 8/1989 | Kotler | |
| 4,875,800 A | 10/1989 | Hicks | |
| 4,877,672 A | 10/1989 | Shreiner | |
| 4,898,493 A * | 2/1990 | Blankenburg | 403/326 |
| 4,917,532 A | 4/1990 | Haberhauer et al. | |
| 4,930,286 A | 6/1990 | Kotler | |
| 4,948,116 A | 8/1990 | Vaux | |
| 4,963,054 A | 10/1990 | Hayashi | |
| 4,996,804 A * | 3/1991 | Naka et al. | 52/126.6 |
| 5,022,200 A | 6/1991 | Wilson et al. | |
| 5,039,365 A | 8/1991 | Rutledge et al. | |
| 5,048,448 A | 9/1991 | Yoder | |
| 5,052,158 A | 10/1991 | D'Luzansky | |
| 5,072,557 A * | 12/1991 | Naka et al. | 52/126.6 |
| 5,111,630 A | 5/1992 | Munsey et al. | |
| D327,748 S | 7/1992 | Dorfman, Jr. | |
| 5,143,757 A | 9/1992 | Skinner | |
| 5,160,215 A | 11/1992 | Jensen | |
| 5,185,193 A | 2/1993 | Phenicie et al. | |
| 5,190,799 A | 3/1993 | Ellingson | |
| 5,205,091 A | 4/1993 | Brown | |
| 5,205,092 A | 4/1993 | Taylor | |
| 5,215,802 A | 6/1993 | Kaars Sijpesteijin | |
| 5,228,253 A | 7/1993 | Wattelez | |
| 5,229,437 A | 7/1993 | Knight | |
| 5,234,738 A | 8/1993 | Wolf | |
| 5,250,340 A | 10/1993 | Bohnhoff | |
| 5,253,464 A | 10/1993 | Nilsen | |
| 5,295,341 A | 3/1994 | Kajiwara | |
| 5,303,669 A | 4/1994 | Szekely | |
| 5,323,575 A | 6/1994 | Yeh | |
| 5,333,423 A * | 8/1994 | Propst | 52/126.6 |
| 5,342,141 A | 8/1994 | Close | |
| 5,364,204 A | 11/1994 | MacLeod | |
| 5,365,710 A | 11/1994 | Randjelovic | |
| 5,377,471 A | 1/1995 | Niese | |
| 5,412,917 A | 5/1995 | Shelton | |
| 5,418,036 A | 5/1995 | Tokikawa et al. | |
| 5,449,246 A | 9/1995 | Housley | |
| 5,466,489 A | 11/1995 | Stahl | |
| 5,509,244 A | 4/1996 | Bentzon | |
| 5,511,353 A | 4/1996 | Jones | |
| 5,527,128 A | 6/1996 | Rope et al. | |
| 5,542,221 A | 8/1996 | Streit et al. | |
| D377,398 S | 1/1997 | Adam | |
| 5,609,000 A | 3/1997 | Niese | |
| 5,616,389 A | 4/1997 | Blatz | |
| 5,628,157 A * | 5/1997 | Chen | 52/263 |
| 5,628,160 A | 5/1997 | Kung | |
| 5,634,309 A | 6/1997 | Polen | |
| 5,640,821 A | 6/1997 | Koch | |
| 5,642,592 A | 7/1997 | Andres | |
| 5,647,184 A | 7/1997 | Davis | |
| 5,682,724 A | 11/1997 | Randjelovic | |
| 5,693,395 A | 12/1997 | Wine | |
| 5,713,175 A | 2/1998 | Mitchell | |
| 5,713,806 A | 2/1998 | Teitgen et al. | |
| 5,749,787 A | 5/1998 | Jank | |
| 5,758,467 A | 6/1998 | Snear et al. | |
| 5,761,867 A | 6/1998 | Carling | |
| 5,787,654 A | 8/1998 | Drost | |
| 5,815,995 A | 10/1998 | Adam | |
| 5,816,010 A | 10/1998 | Conn | |
| 5,816,738 A | 10/1998 | Harnapp | |
| 5,820,294 A | 10/1998 | Baranowski | |
| 5,822,828 A | 10/1998 | Berard et al. | |
| 5,833,386 A | 11/1998 | Rosan et al. | |
| 5,848,856 A | 12/1998 | Bohnhoff | |
| 5,865,007 A | 2/1999 | Bowman et al. | |
| 5,904,015 A * | 5/1999 | Chen | 52/220.2 |
| 5,904,021 A | 5/1999 | Fisher | |
| 5,906,454 A | 5/1999 | Medico et al. | |
| 5,907,934 A | 6/1999 | Austin | |
| 5,910,401 A | 6/1999 | Anderson et al. | |
| 5,937,602 A | 8/1999 | Jalbert | |
| 5,950,378 A | 9/1999 | Council et al. | |
| D415,581 S | 10/1999 | Bertolini | |
| 5,992,106 A | 11/1999 | Carling et al. | |
| 6,017,577 A | 1/2000 | Hosteller et al. | |
| 6,032,428 A | 3/2000 | Rosan et al. | |
| 6,044,598 A | 4/2000 | Elsasser et al. | |
| 6,047,663 A | 4/2000 | Moreau et al. | |
| 6,068,908 A | 5/2000 | Kessler et al. | |
| 6,095,718 A | 8/2000 | Bohnhoff | |
| 6,098,354 A | 8/2000 | Skandis | |
| 6,101,778 A | 8/2000 | Martensson | |
| 6,112,479 A | 9/2000 | Andres | |

(56) References Cited

U.S. PATENT DOCUMENTS

| | | | |
|---|---|---|---|
| 6,128,881 A | 10/2000 | Bue et al. | |
| 6,134,854 A | 10/2000 | Stanchfield | |
| 6,171,015 B1 | 1/2001 | Barth et al. | |
| D437,427 S | 2/2001 | Shaffer | |
| 6,199,328 B1* | 3/2001 | McGrath et al. | 52/127.1 |
| 6,228,433 B1 | 5/2001 | Witt | |
| 6,230,460 B1 | 5/2001 | Huyett | |
| 6,231,939 B1 | 5/2001 | Shaw et al. | |
| 6,286,272 B1 | 9/2001 | Sandoz | |
| 6,301,842 B1 | 10/2001 | Chaney et al. | |
| 6,302,803 B1 | 10/2001 | Barlow | |
| 6,321,499 B1 | 11/2001 | Chuang | |
| 6,324,796 B1 | 12/2001 | Heath | |
| 6,345,483 B1 | 2/2002 | Clark | |
| 6,355,323 B1 | 3/2002 | Iwen et al. | |
| D456,533 S | 4/2002 | Moller, Jr. | |
| 6,418,683 B1 | 7/2002 | Martensson et al. | |
| 6,418,691 B1 | 7/2002 | Stroppiana | |
| 6,428,870 B1 | 8/2002 | Bohnhoff | |
| 6,436,159 B1 | 8/2002 | Safta et al. | |
| 6,444,284 B1 | 9/2002 | Kessler et al. | |
| 6,451,400 B1 | 9/2002 | Brock et al. | |
| 6,453,632 B1 | 9/2002 | Huang | |
| 6,467,224 B1 | 10/2002 | Bertolini | |
| 6,526,705 B1 | 3/2003 | MacDonald | |
| 6,531,203 B2 | 3/2003 | Kessler et al. | |
| 6,543,196 B1 | 4/2003 | Gonzales | |
| 6,562,414 B2 | 5/2003 | Carling | |
| 6,578,324 B2 | 6/2003 | Kessler et al. | |
| 6,585,449 B2 | 7/2003 | Chen | |
| 6,588,166 B2 | 7/2003 | Martensson et al. | |
| 6,604,330 B2* | 8/2003 | Repasky | 52/263 |
| 6,605,333 B2 | 8/2003 | Ferreira et al. | |
| 6,606,834 B2 | 8/2003 | Martensson et al. | |
| 6,617,009 B1 | 9/2003 | Chen et al. | |
| D481,470 S | 10/2003 | Moller, Jr. | |
| 6,637,163 B2 | 10/2003 | Thibault et al. | |
| 6,640,513 B2 | 11/2003 | Ku | |
| 6,669,572 B1 | 12/2003 | Barlow | |
| 6,672,970 B2 | 1/2004 | Barlow | |
| 6,672,971 B2 | 1/2004 | Barlow | |
| 6,682,254 B1 | 1/2004 | Olofsson et al. | |
| D486,592 S | 2/2004 | Hong | |
| 6,684,582 B2 | 2/2004 | Peart et al. | |
| 6,684,592 B2 | 2/2004 | Martin | |
| 6,695,527 B2 | 2/2004 | Seaux et al. | |
| 6,718,714 B1 | 4/2004 | Montgomery | |
| 6,718,715 B2 | 4/2004 | Elliott | |
| 6,736,569 B2 | 5/2004 | Lee | |
| 6,739,797 B1 | 5/2004 | Schneider | |
| D492,426 S | 6/2004 | Strickler | |
| 6,751,912 B2 | 6/2004 | Stegner et al. | |
| 6,769,219 B2 | 8/2004 | Schwitte et al. | |
| 6,793,586 B2 | 9/2004 | Barlow et al. | |
| 6,802,159 B1 | 10/2004 | Kotler | |
| 6,833,038 B2 | 12/2004 | Iwen et al. | |
| 6,851,236 B1 | 2/2005 | Harvey | |
| 6,878,430 B2 | 4/2005 | Milewski et al. | |
| 6,880,307 B2 | 4/2005 | Schwitte et al. | |
| 6,895,881 B1 | 5/2005 | Whitaker | |
| 6,902,491 B2 | 6/2005 | Barlow et al. | |
| 6,962,463 B2 | 11/2005 | Chen | |
| 7,021,012 B2 | 4/2006 | Zeng et al. | |
| 7,029,744 B2 | 4/2006 | Horstman et al. | |
| D522,149 S | 5/2006 | Shin | |
| 7,047,697 B1 | 5/2006 | Heath | |
| 7,065,935 B2 | 6/2006 | Ralf | |
| 7,090,430 B1 | 8/2006 | Fletcher et al. | |
| 7,093,395 B2 | 8/2006 | Hinault et al. | |
| 7,096,632 B2 | 8/2006 | Pacione | |
| 7,114,298 B2 | 10/2006 | Kotler | |
| 7,121,052 B2 | 10/2006 | Niese et al. | |
| 7,127,857 B2 | 10/2006 | Randjelovic | |
| D532,530 S | 11/2006 | Shuman et al. | |
| 7,131,788 B2 | 11/2006 | Ianniello et al. | |
| 7,140,156 B1* | 11/2006 | Lowe et al. | 52/263 |
| 7,144,609 B2 | 12/2006 | Reddick | |
| 7,155,796 B2 | 1/2007 | Cook | |
| 7,211,314 B2 | 5/2007 | Nevison | |
| 7,299,592 B2 | 11/2007 | Moller, Jr. | |
| 7,303,800 B2 | 12/2007 | Rogers | |
| 7,340,865 B2 | 3/2008 | Vanderhoef | |
| 7,383,663 B2* | 6/2008 | Pacione | 52/120 |
| 7,386,963 B2 | 6/2008 | Pervan | |
| 7,412,806 B2 | 8/2008 | Pacione et al. | |
| 7,464,510 B2 | 12/2008 | Scott et al. | |
| 7,516,587 B2 | 4/2009 | Barlow | |
| 7,520,948 B2 | 4/2009 | Tavy et al. | |
| 7,527,451 B2 | 5/2009 | Slater | |
| 7,531,055 B2 | 5/2009 | Mead | |
| 7,543,418 B2 | 6/2009 | Weitzer | |
| 7,563,052 B2 | 7/2009 | Van Reijen | |
| 7,571,572 B2 | 8/2009 | Moller, Jr. | |
| 7,571,573 B2 | 8/2009 | Moller, Jr. | |
| 7,587,865 B2 | 9/2009 | Moller, Jr. | |
| D611,626 S | 3/2010 | Arden | |
| 7,676,291 B2 | 3/2010 | Sheffield et al. | |
| 7,704,011 B2 | 4/2010 | Marshall | |
| D618,368 S | 6/2010 | Jenkins | |
| 7,748,176 B2 | 7/2010 | Harding et al. | |
| 7,748,177 B2 | 7/2010 | Jenkins et al. | |
| 7,793,471 B2 | 9/2010 | Hill | |
| 7,849,642 B2 | 12/2010 | Forster | |
| 7,849,658 B2 | 12/2010 | Platts | |
| 7,900,416 B1 | 3/2011 | Yokubison et al. | |
| 7,955,025 B2 | 6/2011 | Murphy et al. | |
| 7,958,681 B2 | 6/2011 | Moller, Jr. | |
| 8,006,443 B2 | 8/2011 | Fuccella et al. | |
| 8,099,915 B2 | 1/2012 | Moller, Jr. et al. | |
| 8,104,244 B2 | 1/2012 | Pervan | |
| 8,122,670 B2 | 2/2012 | Matthee | |
| D656,250 S | 3/2012 | Forster | |
| 8,225,566 B2 | 7/2012 | Prevost et al. | |
| 2001/0002523 A1 | 6/2001 | Chen | |
| 2002/0108340 A1 | 8/2002 | Elliott | |
| 2003/0009971 A1 | 1/2003 | Palmberg | |
| 2004/0023006 A1 | 2/2004 | Mead | |
| 2004/0035079 A1 | 2/2004 | Evjen | |
| 2004/0258869 A1 | 12/2004 | Walker | |
| 2005/0016098 A1 | 1/2005 | Hahn | |
| 2005/0028475 A1 | 2/2005 | Barlow et al. | |
| 2005/0102936 A1 | 5/2005 | Chen et al. | |
| 2005/0144867 A1 | 7/2005 | Clarke | |
| 2005/0202208 A1 | 9/2005 | Kelly | |
| 2006/0070314 A1 | 4/2006 | Jenkins | |
| 2006/0265975 A1 | 11/2006 | Geffe | |
| 2006/0285920 A1 | 12/2006 | Gettig et al. | |
| 2007/0214741 A1 | 9/2007 | Llorens Miravet | |
| 2007/0289244 A1 | 12/2007 | Haney et al. | |
| 2008/0092473 A1 | 4/2008 | Heyns | |
| 2008/0127593 A1 | 6/2008 | Janesky | |
| 2009/0049768 A1 | 2/2009 | Kim | |
| 2009/0235605 A1 | 9/2009 | Haney | |
| 2010/0107522 A1 | 5/2010 | Getting | |
| 2010/0236176 A1 | 9/2010 | Jenkins | |
| 2011/0045916 A1 | 2/2011 | Casimaty et al. | |
| 2011/0056158 A1 | 3/2011 | Moller, Jr. et al. | |
| 2011/0179728 A1 | 7/2011 | Cerny | |
| 2011/0185658 A1 | 8/2011 | Cerny | |
| 2012/0085043 A1 | 4/2012 | Jenkins | |

FOREIGN PATENT DOCUMENTS

| | | |
|---|---|---|
| EP | 1167652 | 1/2002 |
| FR | 2240320 | 4/1973 |
| GB | 1504811 | 4/1975 |
| GB | 2262437 | 12/1991 |
| GB | 2263644 A | 8/1993 |
| GB | 2353543 | 10/2000 |
| JP | 01/226978 | 9/1989 |
| JP | 03045788 | 11/1997 |
| JP | 2000-248729 | 9/2000 |
| KR | 20/0239521 | 10/2001 |

(56) References Cited

FOREIGN PATENT DOCUMENTS

| KR | 10/2006/0127635 | 12/2006 |
|---|---|---|
| KR | 100743984 | 8/2007 |
| WO | WO 92-01130 | 1/1992 |

OTHER PUBLICATIONS www.invisiblestructures.com website Jul. 26, 2006, 109 pages.
www.mateflex.stores.yahoo.net website Jul. 26, 2006, 68 pages.
www.namintec.com, website, Jul. 26, 2006, 28 pages.
www.polypavement.com/costs.htm, website Mar. 24, 2006, pp. 1-2.
www.polypavement.com/more_info.htm, website Mar. 24, 2006 pp. 1-12.
www.polypavement.com/index.htm, website Mar. 24, 2006, pp. 1-6.
www.arplastsrl.com website, 1 page.
www.polypavement_com_contactus.

"Standard Test Method for Relative Abrasiveness of Synthetic Turf Playing Surfaces"; Copyright ASTM International; Jul. 10, 2003.
"Standard Test Method for Abrasion Resistance of Textile Fabrics (Rotary Platform, Double-Head Method)"; Copyright by ASTM; Jan. 15, 2009.
Swiss Flex® Tile; Print Out of Product Information; http://web.archive.org/web/20010111044400/http://www.swiss-flex.com; as accessed on Jan. 11, 2001; 10 pages.
U.S. Appl. No. 11/731,017, filed Mar. 28, 2007; Ronald A. Yokubison.
U.S. Appl. No. 11/729,549, filed Mar. 28, 2007; Ronald A. Yokubison.
U.S. Appl. No. 29/361,669, filed May 13, 2010; Mark Jenkins.
U.S. Appl. No. 12/774,487, filed May 5, 2010; Ronald Cerny; notice of allowance issued Nov. 8, 2013.
U.S. Appl. No. 12/774,487, filed May 5, 2010; Ronald Cerny; supplemental notice of allowance issued Feb. 5, 2014.

\* cited by examiner

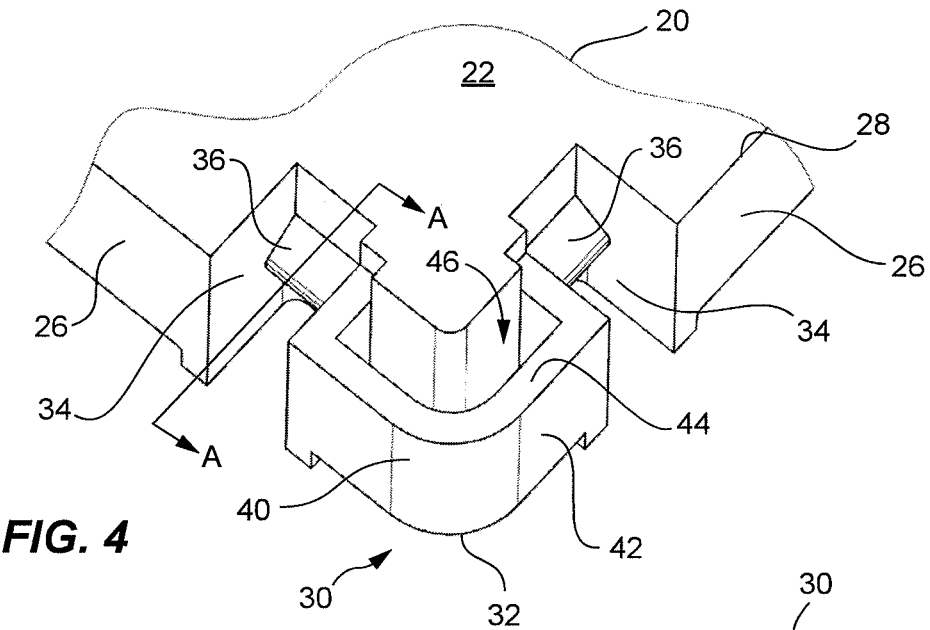
FIG. 4
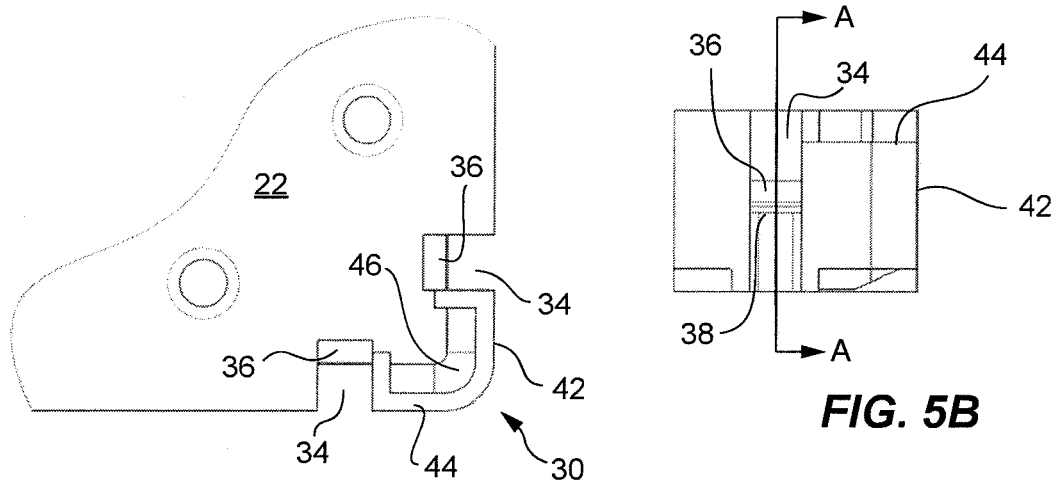
FIG. 5A
FIG. 5B
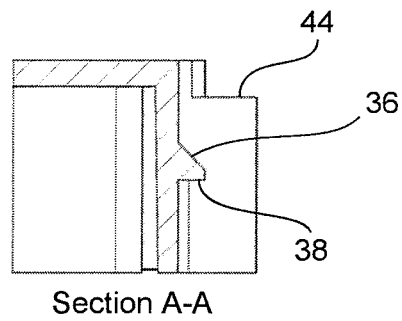
Section A-A
FIG. 5C

Section B-B

Section C-C

Section D-D

Section E-E

Section C-C

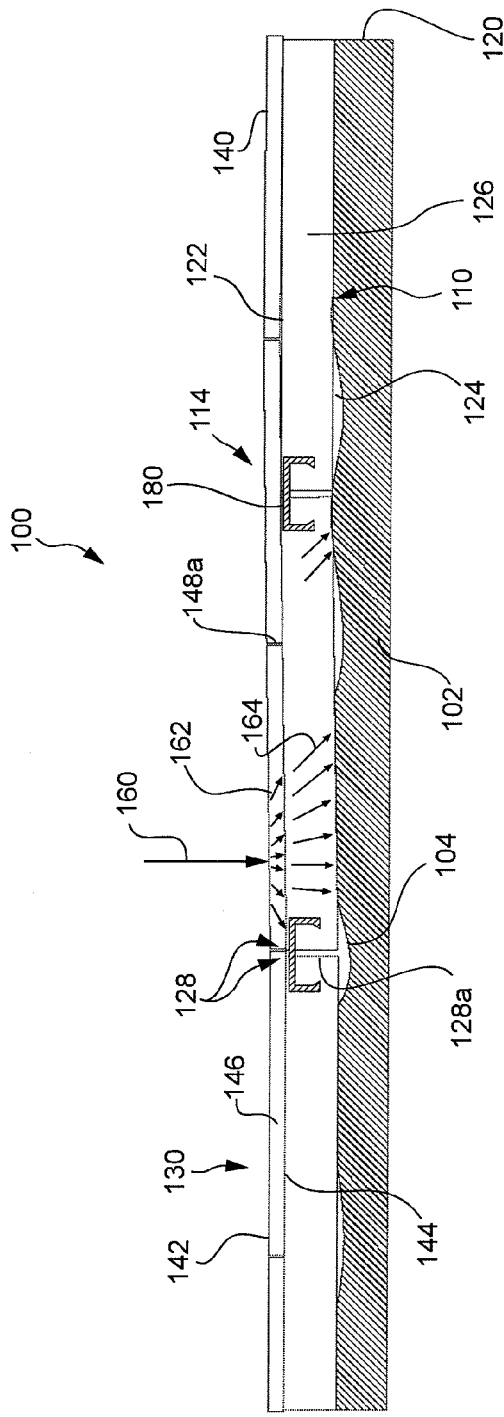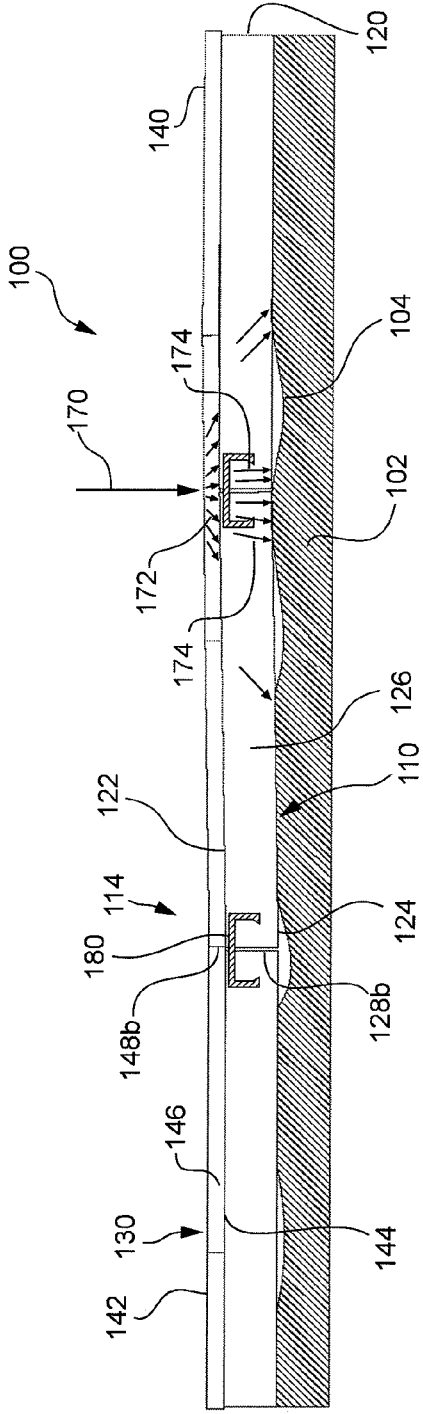

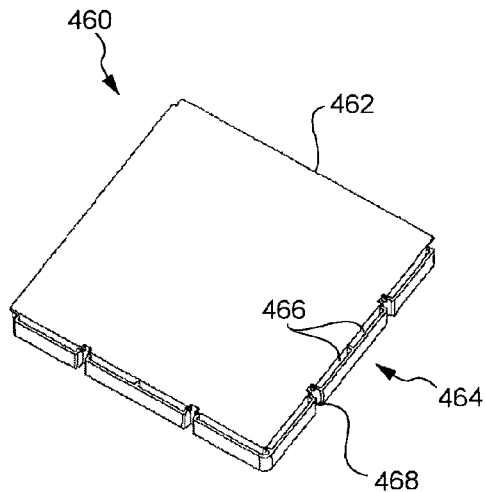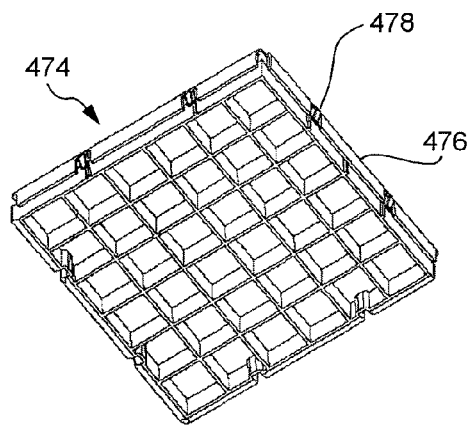
*FIG. 23A*  *FIG. 23B*
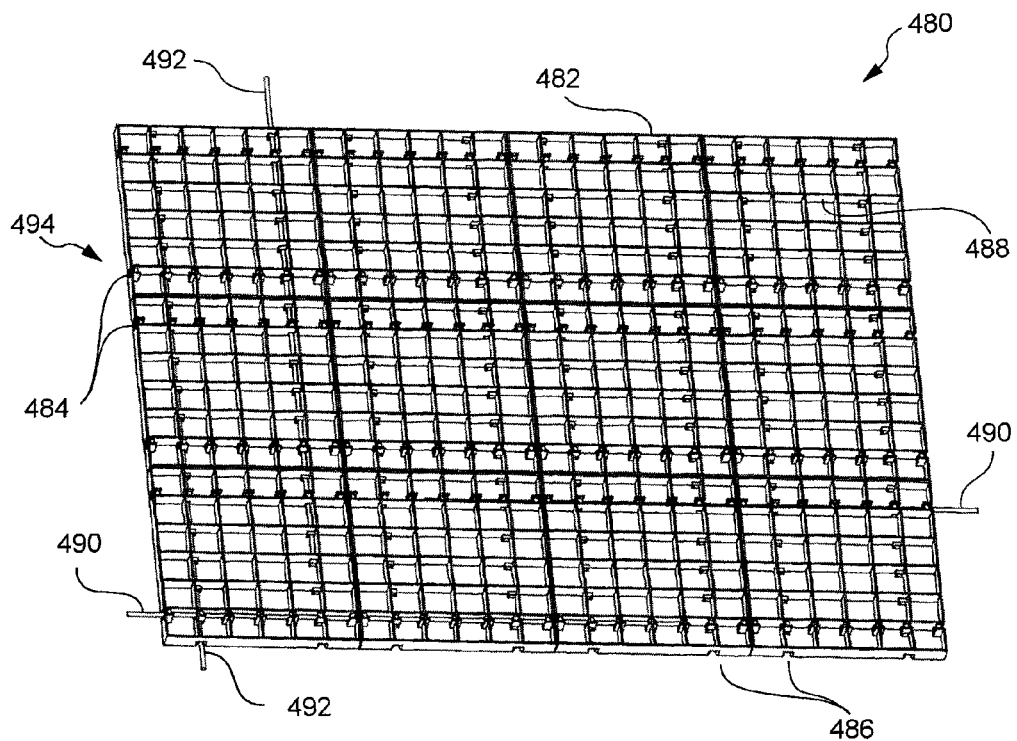
*FIG. 24*

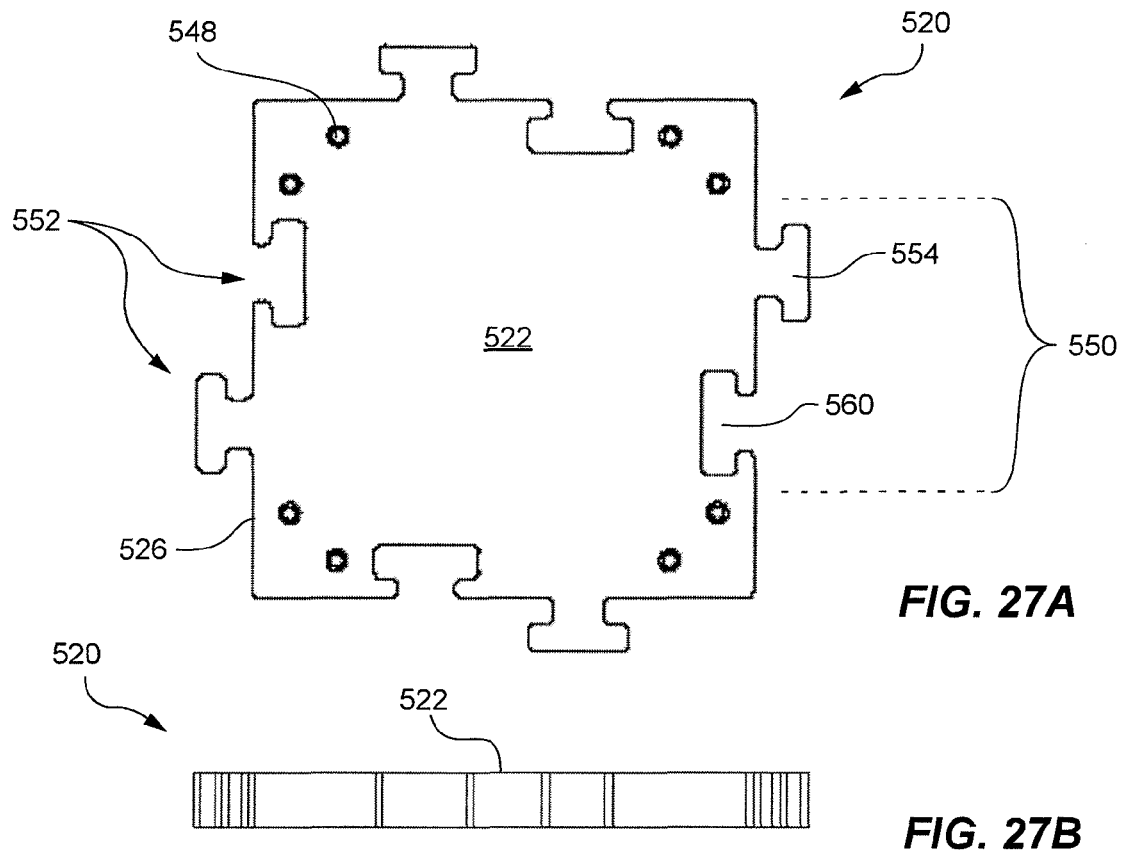
*FIG. 27A*
*FIG. 27B*
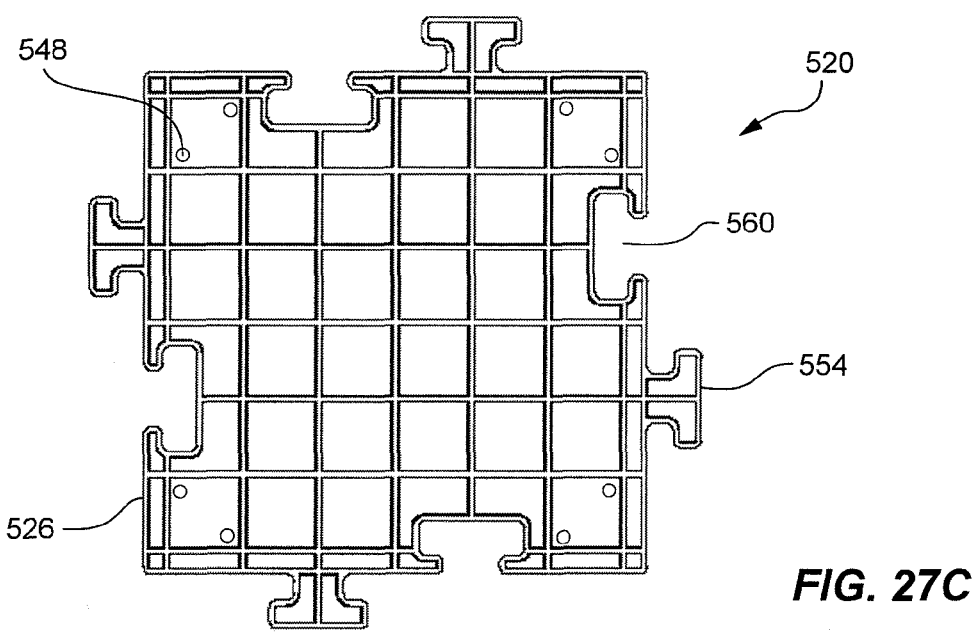
*FIG. 27C*

MODULAR FLOORING SYSTEM

RELATED APPLICATIONS

This application is a continuation-in-part of U.S. patent application Ser. No. 12/774,487 filed on May 5, 2010 now U.S. Pat. No. 8,683,769, and entitled "Modular Sub-Flooring System" which claims the benefit of U.S. Provisional Patent Application No. 61/297,510, filed Jan. 22, 2010, and entitled "Modular Sub-Flooring System", which applications are incorporated by reference in their entirety herein.

FIELD OF THE INVENTION

The present invention relates generally to synthetic sports flooring configurations assembled from a plurality of interlocking modular floor tiles, and more specifically to a modular flooring system configured to replace traditional concrete or asphalt slabs.

BACKGROUND OF THE INVENTION AND RELATED ART

In recent years, the use of flooring configurations made of synthetic or artificial materials to form a flooring surface intended for sports play and other activities has grown in popularity. These synthetic flooring configurations are advantageous for several reasons. For instance, they are easily manufactured and typically formed of materials which are generally inexpensive and lightweight. Thus, if a portion of the flooring configuration becomes damaged, it may easily be removed and replaced at a cost significantly lower than more permanent sports play surfaces. Moreover, these synthetic flooring configurations are modular in nature and are easily removable as they are temporarily placed over a support base. If the entire flooring configuration needs to be relocated, for example, the individual floor tiles making up the flooring configuration can easily be detached from one another, relocated, and then re-assembled to form the flooring configuration in a new location.

The durable plastics from which these flooring configurations or overlayments are formed are long lasting, more so than the alternative traditional floors of asphalt and concrete that are made from primarily natural materials. Additionally, the synthetic material can provide for better performance characteristics, such as improved shock or impact absorption which reduces the likelihood of injury in the event of a fall. For example, the connections for each modular floor tile can even be specially engineered to absorb lateral forces to further reduce the chance of injury. Synthetic flooring configurations are further advantageous in that they generally require little maintenance as compared to non-synthetic flooring materials, such as hardwood boards, etc.

To construct a usable synthetic flooring configuration, a suitable support base is required. The support base provides many functions, namely to provide and maintain a level surface on which the flooring configuration may rest, and to provide a suitable support that resists buckling of the flooring configuration overlaid thereon. Support bases are typically constructed of concrete or asphalt, particularly if the synthetic flooring configuration to be overlaid on the support base is intended for use outdoors or in large indoor areas, such as recreational centers, gymnasiums, etc.

Although traditional support bases of concrete and asphalt are commonly used, there are several inherent difficulties associated with these. First, and foremost, these are permanent structures that require significant effort and expense to install. In addition, once installed, it is highly impractical from a cost and labor standpoint to remove and relocated these support bases in the event one desires to transport the overriding synthetic flooring configuration to a new location. Rather, upon removing and relocating the synthetic flooring configuration to a different site, the old support base is demolished and a new support base is typically constructed at the new location.

Moreover, it is not uncommon for the support base to comprise up to one half or more of the total cost of installing a synthetic flooring configuration, particularly if the support base requires retaining or reinforcement of any kind. This is one reason the cost for installations of synthetic flooring configurations can be high. Contributing to this are various fluctuations in material availability. In the aftermath of natural disasters or other unforeseeable events, for instance, common construction materials can be in short supply, thus driving costs even higher.

Considering international aspects, there are many countries in which concrete or asphalt is unavailable altogether. In these locations, concrete must be imported, which is much too cost prohibitive and impractical in most instances for a game court. In other countries, the technology needed to construct large slabs of concrete or asphalt is practiced or known by only a few, and equipment needed is either scarce or nonexistent.

Another significant problem centers around water drainage. In most instances, current support bases are impervious to water drainage, and therefore must comprise some degree of slope or grade to allow water to flow from its surface. Recently, the number of government covenants and/or regulations placing restrictions on the use of concrete and asphalt in urban areas has been on the rise, as the impervious slabs cause rain water to run off and feed into a storm water drainage system instead of being captured and absorbed locally into the surrounding ground surface.

In addition to the water drainage problems, many cities and counties have limited the construction of additional concrete or asphalt slabs for various other reasons, including maintenance and liability costs. This has significantly limited the number of play areas within certain locations, particularly in large cities where much of the landscape already comprises concrete or asphalt. Because of these restrictions, there are often people in these areas that do not have access to a play area or sports facility.

Traditional concrete and asphalt support bases are also very rigid and hard. They do not provide any degree of inherent flexibility or give, nor do they exhibit any impact absorption characteristics. Thus, any impact or other forces are required to be borne or absorbed solely by the overlying flooring configuration. As such, this has been a critical factor in the design of many synthetic flooring configurations.

Furthermore, concrete and asphalt are also very susceptible to cracking. As these slabs can often experience extreme weather conditions ranging from summer heat to winter snow, such conditions can have a detrimental effect on the concrete or asphalt surface, which can become irregular, inconsistent, and unusable over time.

Based on the foregoing, it would be advantageous to provide a support base for a synthetic flooring configuration or overlayment that is less permanent and which can be easily relocated and installed at another location, that is relatively easy and inexpensive to install, that is able to better facilitate water drainage from the overriding overlayment, and which can include characteristics or properties that contribute to overall performance of the sports play surface, such as helping to reduce the likelihood of injury, etc.

SUMMARY OF THE INVENTION

In light of the problems and deficiencies inherent in the prior art, a modular sub-flooring system is provided for supporting an overlayment above a ground surface that includes a first sub-floor tile having a first substantially-flat top surface, and a second sub-floor tile adjacent the first sub-floor tile and having a second substantially-flat top surface. The sub-flooring system also includes at least one bridge connector coupled between the first and second sub-floor tiles to facilitate controlled relative lateral movement and to restrain relative vertical movement between the sub-floor tiles, while maintaining a substantially smooth top surface alignment across adjacent edges of the first and second top surfaces. While a sub-flooring assembly is specifically mentioned herein, it is important to note that any of the sub-floor tiles and related connecting members described in this application may be used as a primary flooring surface.

In accordance with another embodiment described herein, a modular sub-flooring system is provided for supporting an overlayment above a ground surface that includes a plurality of sub-floor tiles situated about a ground surface, with each sub-floor tile having a substantially-flat top surface that is adapted to receive and support an overlayment, and at least one connection interface with opposing engagement surfaces. The sub-flooring system further includes a plurality of removable bridge connectors, each tile connector having a plurality of tile interfaces having complimentary engagement surfaces that engage the opposing engagement surfaces of a connection interface. The sub-floor tiles and bridge connectors are configured so that the tile interfaces of the bridge connectors couple to the respective connection interfaces of the adjacent sub-floor tiles to restrain relative vertical movement in both directions and without anchoring to ground, and facilitate controlled relative lateral movement between the adjacent sub-floor tiles.

In accordance with yet another embodiment described herein, a synthetic sub-flooring system is provided for supporting an overlayment above a ground surface that includes a plurality of synthetic sub-floor tiles situated about a ground surface, with each sub-floor tile having a substantially-flat top surface adapted to receive and support an overlayment, and at least one connection interface. The sub-flooring system also includes a plurality of synthetic bridge connectors, with each bridge connector having a plurality of tile interfaces that are complimentary with the connection interfaces on the sub-floor tiles. Moreover, the tile interfaces of any bridge connector couple to the respective connection interfaces of any adjacent sub-floor tile and form a synthetic sub-flooring system having ball bounce characteristics that are substantially similar to concrete or asphalt.

In accordance with another embodiment described herein, a method is provided for installing an overlayment above a ground surface, which method includes installing a first sub-floor tile having a first substantially-flat top surface on a ground surface, and installing a second sub-floor tile having a second substantially-flat top surface on the ground surface adjacent the first sub-floor tile. The method also includes installing at least one bridge connector between the first and second sub-floor tiles which is adapted to facilitate controlled relative lateral movement while restraining relative vertical movement between the sub-floor tiles, and maintaining a substantially smooth top surface alignment between adjacent edges of the first and second top surfaces while allowing each sub-floor tile to individually tilt and conform to the ground surface. The method further includes installing the overlayment over the adjacent first and second top surfaces.

In accordance with yet another embodiment described herein, a method is provided for preparing a modular sub-flooring system for supporting an overlayment above an earthen ground surface. The method includes the steps of preparing an earthen ground surface to a substantially planar elevation, obtaining a plurality of sub-floor tiles, with each sub-floor tile having a substantially-flat top surface adapted to receive and support an overlayment and at least one connection interface with opposing engagement surfaces, and installing the plurality of sub-floor tiles adjacent to each other over the prepared earthen ground surface. The method also includes the steps of obtaining at least one removable bridge connector having a plurality of tile interfaces, with each tile interface having complimentary engagement surfaces that are connectable with the opposing engagement surfaces, and installing the at least one bridge connector between adjacent sub-floor tiles so that the opposing engagement surfaces interconnect with the complimentary engagement surfaces. The method further includes restraining relative vertical movement between the sub-floor tiles and allowing controlled relative lateral movement between the sub-floor tiles, while maintaining a substantially smooth top surface alignment across the plurality of sub-floor tiles despite a variation in angular orientation of any individual sub-floor tile.

In accordance with yet another embodiment described herein, a modular sub-flooring system is provided supporting an overlayment above a ground surface, which sub-flooring system includes a first sub-floor tile having a first substantially-flat top surface, a second sub-floor tile adjacent the first sub-floor tile having a second substantially-flat top surface, and a bridging means separate from the first and second sub-floor tiles and for connecting the first and second sub-floor tiles, wherein the bridging means is adapted to restrain relative vertical movement while facilitating controlled relative lateral movement between the adjacent sub-floor tiles.

In accordance with another embodiment described herein, a synthetic sports flooring system is provided for receiving and absorbing an impact force acting thereon. The sports flooring system includes an overlayment disposed about a sub-flooring system. The overlayment comprises a contact surface for receiving an impact force, and a force transfer element having a first impact absorbing characteristic, with the force transfer element absorbing at least a portion of the impact force and transferring a remainder of the impact force to the sub-flooring system. The sports flooring system further includes the sub-flooring system, which comprises a plurality of sub-floor tiles situated about a ground surface and a plurality of bridge connectors coupled between adjacent sub-floor tiles. Each sub-floor tile further comprises a generally-planar top surface supporting the overlayment thereon, and a plurality of brace members being a primary load bearing component and having a second impact absorbing characteristic. The bridge connectors are adapted to allow controlled relative lateral movement while restraining relative vertical movement between the adjacent sub-floor tiles. Additionally, the remainder of the impact force transferred from the overlayment is distributed primarily to the plurality of brace members of any sub-floor tile and not to an adjacent sub-floor tile.

BRIEF DESCRIPTION OF THE DRAWINGS

Features and advantages of the present invention will be apparent from the detailed description that follows, and when taken in conjunction with the accompanying drawings together illustrate, by way of example, features of the present invention. It will be readily appreciated that these drawings and their attendant descriptions merely depict representative embodiments of the invention and are not to be considered limiting of its scope, and that the components of the invention, as generally described and illustrated in the figures herein, could be arranged and designed in a variety of different configurations. Nonetheless, the invention will be described and explained with additional specificity and detail through the use of the accompanying drawings, in which:

FIG. 4 is a close-up perspective view of the first connection interface of the modular floor/sub-floor tile of FIG. 2;

FIGS. 5A-5C together illustrate the top, side and cross-sectional (as taken through section line A-A) views of the first connection interface of FIG. 4.

FIGS. 13A-13B together illustrate schematic side views of the modular sub-flooring system of FIG. 1 in thermally-contracted and expanded states, respectively, and having an overlayment;

FIGS. 23A-23B together illustrate top and bottom perspective views of a modular flooring/sub-flooring system, in accordance with yet another representative embodiment;

FIG. 24 is a bottom perspective view of a modular flooring/sub-flooring system, in accordance with yet another representative embodiment.

FIGS. 27A-27C together illustrate the top, side and bottom views of the modular floor/sub-floor tile of FIG. 25;

DETAILED DESCRIPTION OF EXEMPLARY EMBODIMENTS

The following detailed description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made without departing from the spirit and scope of the present invention. As such, the following detailed description is not intended to limit the scope of the invention as it is claimed, but rather is presented for purposes of illustration, to describe the features and characteristics of the representative embodiments, and to sufficiently enable one skilled in the art to practice the invention. Accordingly, the scope of the invention is to be defined solely by the appended claims.

Furthermore, the following detailed description and representative embodiments of the present invention will best understood with reference to the accompanying drawings, wherein the elements and features of the embodiments are designated by numerals throughout.

Illustrated in FIGS. 1-29 are several representative embodiments of a modular sub-flooring system for supporting an overlayment, such as synthetic sports flooring configuration, which embodiments also include various methods for preparing and installing the sub-flooring system. As described herein, the modular sub-flooring system provides several significant advantages and benefits over other sub-flooring systems for supporting synthetic sports flooring configurations. However, the recited advantages are not meant to be limiting in any way, as one skilled in the art will appreciate that additional advantages not described herein may also be realized upon practicing the present invention. As discussed herein, while reference is made specifically to sub-flooring systems, it is understood that any of the sub-floor tiles and related connecting members described in this application may be used as a primary flooring surface. That is, the thicker, more durable, sub-floor assembly may be used as a primary flooring system without any flooring system used over the top thereof as suits a particular application.

Figure 1:
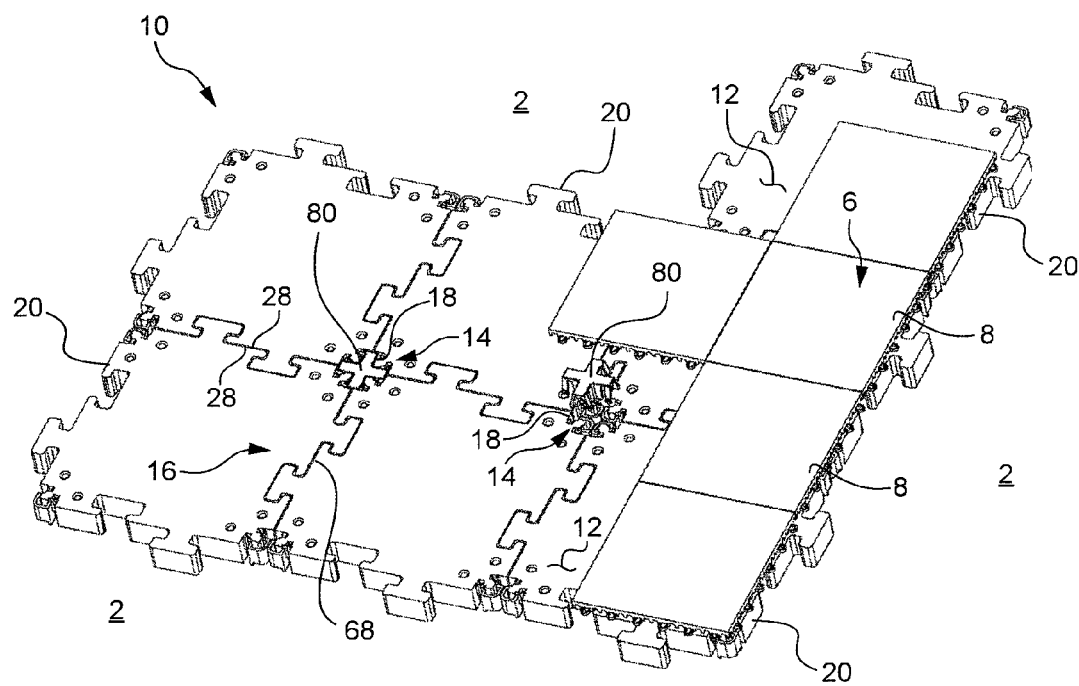
FIG. 1 is a perspective view of a modular flooring/sub-flooring system, in accordance with one representative embodiment.

FIG. 1 shows a representative embodiment of a modular sub-flooring system 10 that comprises a plurality of modular, synthetic sub-floor tiles 20 placed over a ground surface 2 and coupled together with a plurality of bridge connectors 80 to form the assembled synthetic sub-flooring system. Both the bridge connectors 80 and the sub-floor tiles 20 can be individually removable and replaceable. While non-removable bridge connectors (i.e., connectors that must be installed with the use of tools) may be used, the removable bridge connectors are preferable for ease of installation. That is, the removable bridge connectors are easily installed by hand.

During assembly of the sub-flooring system 10, complimentary connection interfaces on the bridge connectors and the sub-floor tiles engage with each other to form a non-rigid bridging interconnection 14 that restricts relative vertical movement between adjacent sub-floor tiles, and thereby maintains a substantially smooth top surface alignment across the adjacent edges 28 of the adjacent tiles. Thus, the modular sub-flooring system 10 provides a removable and replaceable base support structure with a substantially smooth top surface 12 that is suitable for supporting an overlayment 6, such as a synthetic sports flooring configuration assembled from a plurality of interlocking modular floor tiles 8. Both the bridge connectors 80 and the sub-floor tiles 20 can be made from a durable plastic or similar synthetic material, including but not limited to any plastic, rubber, foam, concrete, epoxy, fiberglass, or other synthetic or composite material. Furthermore, both the bridge connectors 80 and the sub-floor tiles 20 can be formed using any manufacturing process familiar to one of skill in the art for forming plastic, synthetic and/or composite parts, including but not limited to injection-molding, compression-molding, thermoforming, extrusion, casting, resin impregnation or transfer-molding processes, etc. The plastic or synthetic material can be configured with a pre-determined modulus of elasticity and coefficient of thermal expansion to control the impact absorption and thermal expansion characteristics of each individual sub-floor tile and for the overall sub-flooring system 10. In one aspect, moreover, the synthetic material can include one or more recycled components which can reduce costs and result in a more environmentally-benign sub-flooring system.

In addition to restricting relative vertical movement, the non-rigid bridging interconnection 14 facilitates controlled relative lateral movement between the sub-floor tiles. This capacity for controlled lateral movement can be provided by a plurality of first clearance gaps 18 between the vertical surfaces of the bridging interconnection that are sufficiently large to accommodate small lateral movements between adjacent sub-floor tiles, such as those movements caused by thermal expansion and contraction, shifts in the underlying ground surface 2, and from impacts or steady-state forces transferred from the overlayment above.

For example, the first clearance gaps 18 in the bridging interconnection 14 can allow each sub-floor tile to expand or contract within its own footprint without becoming bound within the coupling interface. This can be advantageous, as the capacity to accommodate the thermal expansion of the sub-floor tiles on hot summer days serves to eliminate or substantially reduce any heat-induced buckling of the sub-flooring system that can mar or disrupt the smooth playing surface of the overlayment 6. Likewise, the capacity to accommodate the thermal contraction during cold winter nights can eliminate or substantially reduce any tensile loading placed on the various connection interfaces when the sub-floor tiles pull away from each other, and which could otherwise result in cracking and/or breakage of the stressed parts.

The non-rigid bridging interconnection 14 between the sub-floor tiles and the bridge connectors can be configured to maintain the top surface alignment despite variations in the underlying ground surface 2, while still allowing impact forces received by any individual sub-floor tile 20 to be primarily absorbed and distributed to ground by the same sub-floor tile. Thus, the modular sub-flooring system 10 can provide a performance similar to that of concrete or asphalt by absorbing and distributing impact forces received from the overlayment 6 substantially directly to ground 2 and not to an adjacent sub-floor tile.

The bridging interconnections 14 can be configured to restrict the relative vertical movement between adjacent sub-floor tiles without additional anchoring to ground, so that the entire sub-flooring system 10 can "float" laterally over the ground surface 2. As used therein, the term float signifies that the sub-flooring system does not use or require an anchoring device (such as a stake, etc.) to secure the sub-flooring system to the ground surface. Instead, the friction forces and/or the physical engagement between the bottom of the sub-floor tiles and the ground surface can be sufficient to hold the sub-flooring system 10 in place during use, but which can still allow the sub-flooring system to expand, contract or shift as a body over the ground surface 2 if necessary.

In turn, the overlayment may or may not be anchored to the sub-flooring system 10 which supports the overlayment 6 from below. In the situations where it is not anchored, the overlayment can also "float" laterally over the sub-flooring system's top surface 12, in which case friction forces between the sub-flooring system and the overlayment can secure the overlayment in place, while still allowing for relative lateral movement between the sub-flooring system 10 and overlayment 6 during thermal cycling caused by different structural designs and/or different coefficients of thermal expansion.

As also shown in FIG. 1, the sub-floor tiles 20 of the modular sub-flooring system 10 can include a non-rigid alignment interconnection 16 that facilitates the alignment and placement of the sub-floor tiles adjacent to each other on the ground surface 2 prior to the attachment of the bridge connectors 80. Like the first clearance gaps 18 found in the bridging interconnection, 14, the alignment interconnection 16 can be configured with second clearance gaps 68 between the sidewalls of the sub-floor tiles that maintain, and do not limit, the controlled relative lateral movement provided by the bridging interconnection 14. Moreover, the clearance gaps 68 separating the sides of the sub-floor tiles can also provide a drainage path to ground, as well as a limited volume for the temporary storage of liquids before they can be absorbed by the ground surface.

Figure 2:
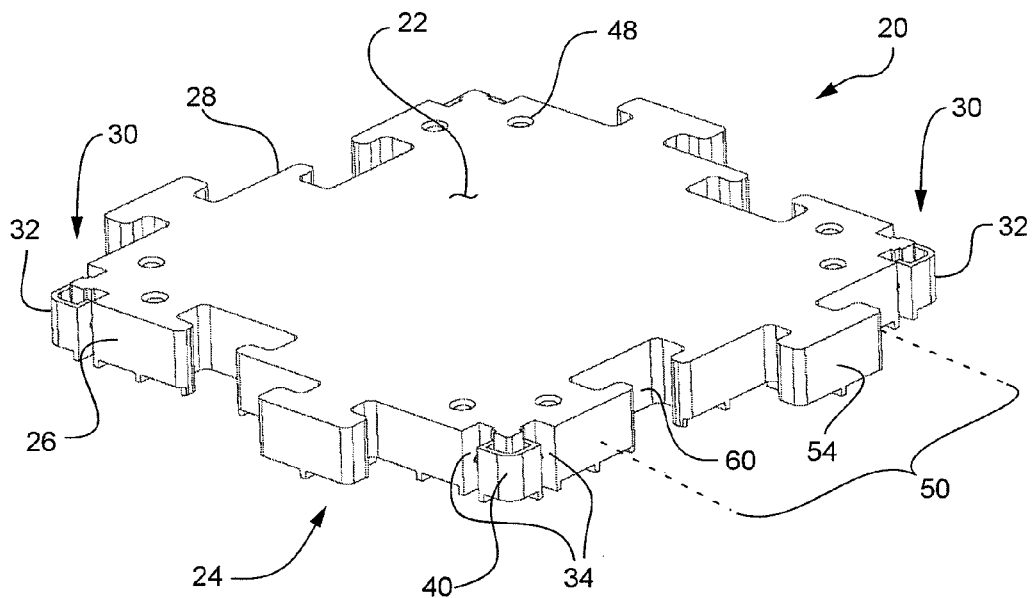
FIG. 2 is a perspective view of a modular floor/sub-floor tile; in accordance with the embodiment of FIG. 1.

Illustrated in FIG. 2 is a representative modular sub-floor tile 20 in accordance with the sub-flooring system of FIG. 1. The sub-floor tile 20 can include a top surface 22, a bottom surface 24 and outer sidewalls 26, with the top surface and outer sidewalls joined together at a top edge 28 extending about the periphery of the sub-floor tile. Furthermore, the sub-floor tile includes a first connection interface 30 that engages with the tile interface on the bridge connectors to form the non-rigid bridging interconnection between the sub-floor tiles and the bridge connectors, as described above. In the representative embodiment shown, the first connection interface 30 can comprise various structures located at the corners 32 of the synthetic sub-floor tile, such as a corner pocket 40 formed into each corner with two corner slots 34 formed adjacent to and on either side of the corner pocket 40. It is to be appreciated, however, that in other embodiments the first connection interface 30 can comprise structures formed into or attached to the sub-floor tile at locations separate and apart from the corners, such as at one or more middle locations along the sidewalls, or along the entire length of the sidewalls of the sub-floor tile, etc.

The sub-floor tile 20 may also include one or more second connection interfaces 50 that engage with mirroring second connection interfaces on adjacent sub-floor tiles to form the non-rigid alignment interconnection. The interface can also be configured so that an upper edge portion of any sub-floor tile does not extend over a lower edge portion of an adjacent sub-floor tile. Stated differently, a lower edge portion of any sub-floor tile may not overlaid by a center or upper edge portion of an adjacent sub-floor tile, such as would be the arrangement with in a tongue-and-groove or similar overlapping-type interconnection. This aspect can allow each sub-floor tile to be individually removable along a vertical axis and without removing or disturbing an adjacent sub-floor tile.

Figure 3A:
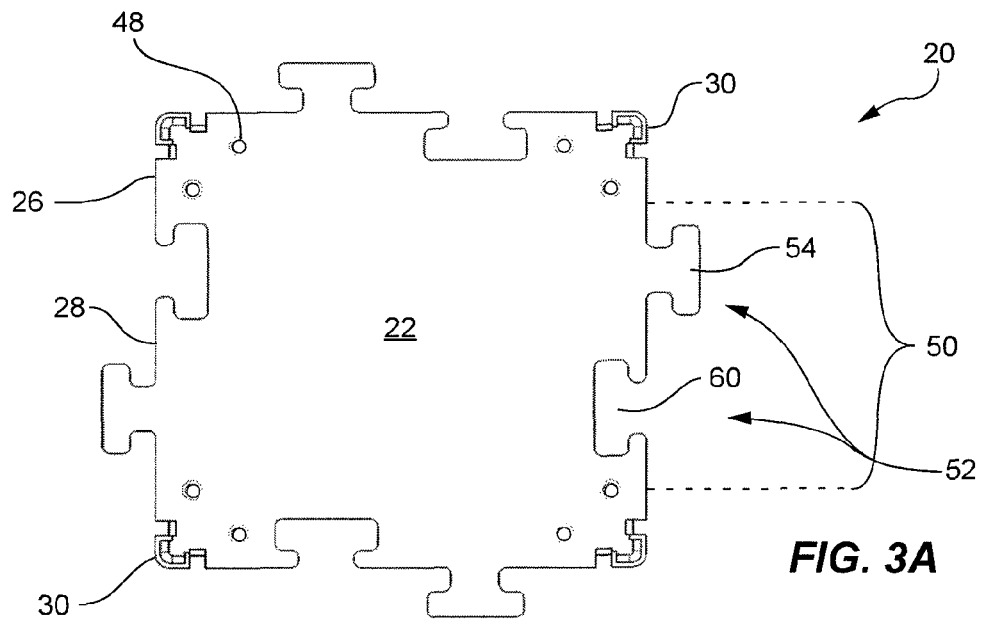
FIGS. 3A-3C together illustrate the top, side and bottom views of the modular floor/sub-floor tile of FIG. 2.

In the representative sub-floor tile of FIG. 2, for instance, the second connection interface 50 can comprise a tab 54 projecting outwards from a sidewall 26 of the sub-floor tile and which is next to a complimentary cut-out 60 extending inward from the same sidewall, as also shown in FIG. 3A. The tab 54 and cut-out 60 can together form a pair of puzzle pieces 52 that interconnect in a non-rigid fashion with a matching pair of puzzle pieces formed into adjacent sub-floor tiles. Moreover, the interconnecting puzzle pieces can be sized so that the tab fits loosely within the cut-out so as to not restrict lateral movement once the modular sub-flooring system has been assembled. The interconnecting pieces are sized and configured such that they slide into position vertically, not horizontally. Advantageously, in accordance with one embodiment, the interconnecting puzzle pieces restrict the lateral movement of adjacent tiles without the use of other mechanical fasteners such as screws or bolts. In this manner, the tiles provide the function of floor cohesion with the added benefit of ease of installation and removal. Moreover, it permits some movement to prevent stress on the flooring assembly.

Figure 3B:
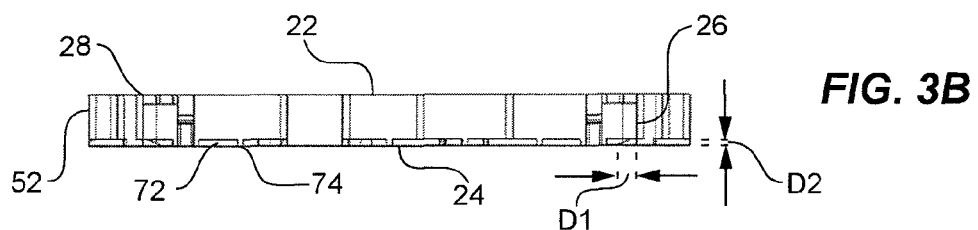
Figure 3C:
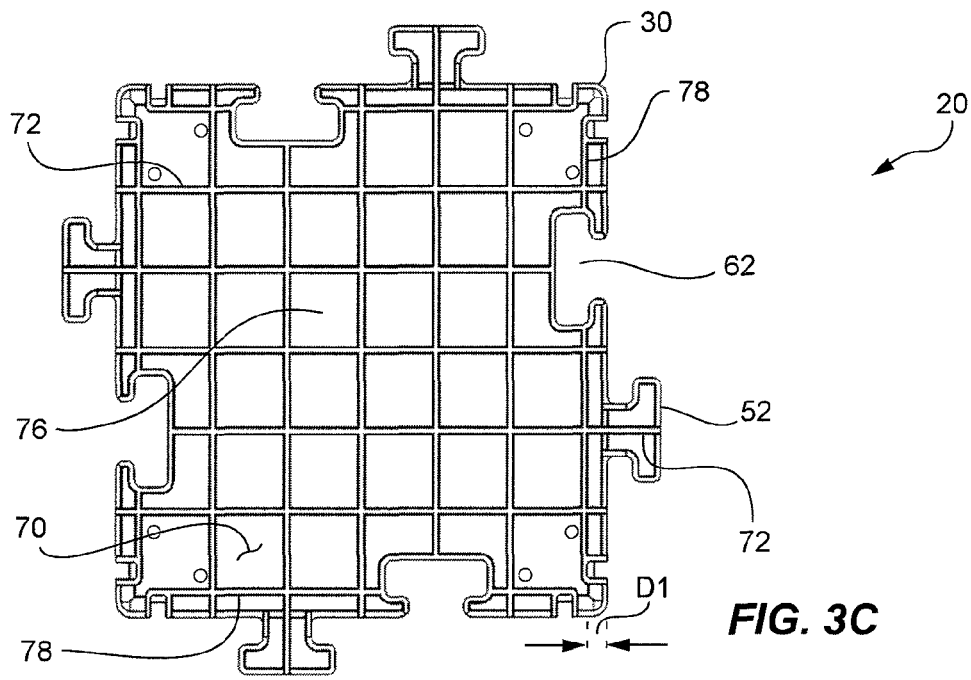

As illustrated in FIGS. 3B and 3C, the underside of the sub-floor tile 20 can include a plurality of intersecting support ribs 72 that are coupled to or integrally-formed with the underside surface 70 of the flat panel that provides the top surface 22 of the sub-floor tile. The bottom edges 74 of the supporting ribs can thus define the bottom plane 24 of the sub-floor tile 20, and can be located over both prepared and unprepared ground surfaces. In one aspect, a prepared ground surface can comprise a smoothed or flattened surface of dirt, grass, clay, sand or loose aggregate, etc., which can shift upwards into the cavities 76 formed by the intersecting support ribs to further surround and grip the lower sides of the support ribs 72. In another aspect, the prepared ground surface can comprise pre-existing concrete or asphalt slabs which can grip the bottom edges 74 of the sub-floor tiles through friction alone. This may be necessary, for instance, in cases where the concrete or asphalt may be in a poor state of repair, and thus would be unsuitable to support an overlayment directly, but would also be prohibitively expensive to remove and dispose of before installing the new flooring system.

In contrast to the prepared ground surfaces, an unprepared ground surface can comprise an un-modified layer of dirt, grass, clay, sand or aggregate, etc., that includes minor contours or natural undulations in the surface which can be accommodated by the non-rigid and somewhat flexible interconnections between the sub-floor tiles that allow each tile to tilt relative to an adjacent tile. However, it may be appreciated that the minor contours and undulations can be smoothed and leveled over time by the combined weight of the sub-floor tiles, the overlayment, and the applied forces and impacts that are distributed to the ground surface by the sub-floor tiles.

In one aspect of the modular sub-flooring system, both the sidewalls 26 and the perimeter-defining support ribs 78 running underneath and parallel to the outer edges or sidewalls of the sub-floor tile 20 can extend all the way to the ground surface, so as to provide maximum support along the outer perimeter edges of each sub-floor tile 20. In another aspect of the modular sub-flooring system, however, the perimeter-defining support ribs 78 can be set-back a distance "D1" from the sidewalls 26. This set-back can provide more space directly underneath the outer edges and second connection interface for shifting or displacement of the ground surface, as well as lift the bottom edge of the sidewalls a distance D2 above the ground surface. This additional space can reduce the likelihood that any material or particulate matter will be caught up or captured in the second clearance gap 68 between adjacent sub-floor tiles, and which could restrict the intended range of movement of the sub-floor tile and/or the flexibility of the modular sub-flooring system. Nevertheless, the underlying support ribs 72 running laterally outward and perpendicular to any outer edge can also extend all the way to each sidewall, so as to provide the top surface 22 with complete support from edge-to-edge.

A distinct advantage of the modular sub-flooring system described herein is the capability to provide a support base for an overlayment or synthetic sports flooring configuration that performs substantially similar to the more-traditional concrete or asphalt slabs in many respects, but which is also easily removable and replaceable while providing a higher margin of safety against falls and impacts. For example, one performance parameter which factors into the selection of any particular support base is "ball bounce". For the purposes of this application, ball bounce can be defined as the ability of a bouncing ball released from a height above the flooring to bounce and return to a level that is below but substantially close to the release height, taking into consideration the effects of friction and energy lost during the elastic deformation of the ball as it contacts the flooring. Although both the deformable ball and a layer of synthetic or hardwood flooring can provide a certain level of elastic response, structural factors contributing to ball bounce can include the stiffness and/or elastic response provided by the sub-flooring system which supports the overlying flooring configuration, and whether the entire flooring system (both the sub-flooring and the sports play overlayment) is sufficiently stiff to allow the ball to spring back upwards with a minimal amount of damping and energy absorption.

The ball-bounce parameter can be high with the traditional outdoor sports play surfaces made entirely of concrete or asphalt, but with the obvious detriment of a hard, unyielding top surface which raises the risk of an injury. A suspended indoor sports flooring system having a surface made of hardwood or similar material can provide a cushioning effect that also reduces the chance of injury, but can only be used indoors. A synthetic sports flooring designed for indoor/outdoor use over concrete or asphalt can also provide some the injury-saving cushioning along with an underlying stiffness that supports a high ball bounce. However, as stated above, pouring a permanent concrete or asphalt base as a sub-flooring layer for the synthetic sports flooring surface can be prohibitively expensive.

It has been discovered by the inventors that the modular sub-flooring system described herein can provide a synthetic flooring system with a ball bounce parameter that is substantially similar to that provided by concrete alone, while simultaneously offering significant improvement in impact absorption over a bare concrete surface and sports play surfaced comprised of a synthetic tile on concrete. As shown in Table 1 below, a percentage ball bounce measurement for the modular sub-flooring system in comparison to concrete can be obtained using a modified ASTM F2772-09 test, entitled the "Standard Specification for Athletic Performance Properties of Indoor Sports Floor Systems", while a critical fall height measurement can be obtain using a modified ASTM F1292-09 test, entitled the "Standard Specification for Impact Attenuation of Surfacing Materials within the Use Zone of Playground Equipment".

TABLE 1

Ball Bounce/Critical Fall Height Performance Data

| Tile | Sub-floor/Sub-surface | Ball Bounce (%) | Critical Fall Height (cm) |
|---|---|---|---|
| — | Concrete (10 cm thick)/Compacted Dirt | 100.0 | 2.5 |
| Tile "A" | Concrete (10 cm thick)/Compacted Dirt | 100.1 | 60.9 |
| Tile "A" | MSF System/Compacted Dirt (20.3 cm thick) | 99.0 | 121.9 |
| Tile "A" | MSF System/Compacted Sand (20.3 cm thick) | 101.3 | 137.2 |
| Tile "A" | MSF System/Pea Gravel (20.3 cm thick) | 99.3 | 119.4 |
| Tile "A" | MSF System/<3/4" Aggregate (20.3 cm thick) | 100.3 | 109.2 |
| Tile "A" | MSF System/Crusher Fines (20.3 cm thick) | 101.5 | 109.2 |
| Tile "A" | MSF System/Crusher Fines (2.5 cm thick) on <3/4" Aggregate (17.8 cm thick) | 101.4 | 109.2 |

Referring now to the first data column in Table 1, the percentage ball bounce of a simple concrete pad is 100%, while the ball bounce of a representative synthetic tile "A" on concrete is 100.1%. Depending on the thickness and type of sub-surface material used to support the sub-floor, the ball bounce measurement for the same synthetic floor tile "A" on the Modular Sub-Flooring System ("MSF System") can provide a ball bounce that is between 99% and 101.5% that of concrete alone, illustrating that a synthetic flooring system comprised of any overlayment installed over the modular sub-flooring system can provide a ball bounce performance that is substantially similar to the representative synthetic tile "A" on concrete. As can also be seen, the modular sub-flooring system described herein can also provide the synthetic flooring system with an impact absorption performance that ranges from a 79% to a 102% improvement over the same representative synthetic tile "A" on concrete.

It is thought that the reasons for the enhanced performance of the modular sub-flooring system include, at least in part, the overall height of the individual modular sub-floor tiles, the thickness and uniform spacing of the underlying support ribs, and the thickness of the top panel of the sub-floor tile, as well as the improved connection between the ground surface and the individual sub-floor tile that allows an impact force imparted to the top of any sub-floor tile to be transferred directly to ground by that tile, and not to an adjacent sub-floor tile through an interlocking interface.

With regards to the sub-floor tile 20 illustrated in FIGS. 3A-3C, for example, it is contemplated that the improved ground surface-to-sub-floor tile connection is the result of both the underlying support ribs 72 that run laterally, edge-to-edge under each tile, and which provide the force transfer members that direct the impact forces to ground and are upheld by the ground in return, and by the first 30 and second 50 interconnecting (e.g. not interlocking) interfaces that eliminate any rigid structural interconnection that would transfer the impact forces across a tile-to-tile boundary. By configuring the alignment or second connection interface to maintain a lateral alignment between adjacent tiles, but not to be so rigid as to transfer vertical forces or loadings directly between the sub-floor tiles, each sub-floor tile can instantaneously deflect slightly into the ground surface below upon impact to establish a stiff and rigid connection between the ground surface and the overlying sports flooring, so that a bouncing ball receives a firm and undamped response that is substantially similar to the impetus provided by a synthetic sports flooring overlaid on a hardened surface like concrete or asphalt. In one embodiment of the invention, underlying support ribs 72 range in thickness from approximately ⅛ to ¼ inches. The height of the tile ranges from approximately 1.5 to 3.0 inches. The top surface of the tiles ranges from approximately ⅛ to ¼ inches. The rib thickness, height of the tile, and thickness of the tile surface provide a specific heavy load-bearing advantage to the tile.

FIG. 4 is a close-up perspective view of the representative first connection interface 30 formed into the modular sub-floor tile 20 shown in FIG. 1 and FIG. 2. As illustrated, the first connection interface 30 may be formed into each corner 32 of the sub-floor tile, and can include two corner slots 34 formed into both sidewalls 26 and adjacent to a corner pocket 40. Each corner slot 34 can further include one or more locking tabs 36 having a downward-facing tab surface 38 operating as one of the bearing surfaces configured to engage with the tile connection interface on the bridge connector. The first connection interface's other engagement surface can be the upward-facing pocket top 44, or top surface of the pocket wall 42 that extends around each corner to form the boundary of the pocket recess 46. As further illustrated in FIGS. 5A-5B, as well as FIG. 5C as viewed from Section line A-A, the downward-facing tab surface 38 of the locking tab 36 and the upward-facing pocket top 44 can be configured as opposing engagement surfaces which, by reason of their horizontal orientation, can restrict movement of the corner 32 of the sub-floor tile 20 in the vertical direction. Additionally, both the corner slots 34 and the pocket recess 46 can provide structural niches for accommodating the various parts of the bridge connector.

Figure 6:
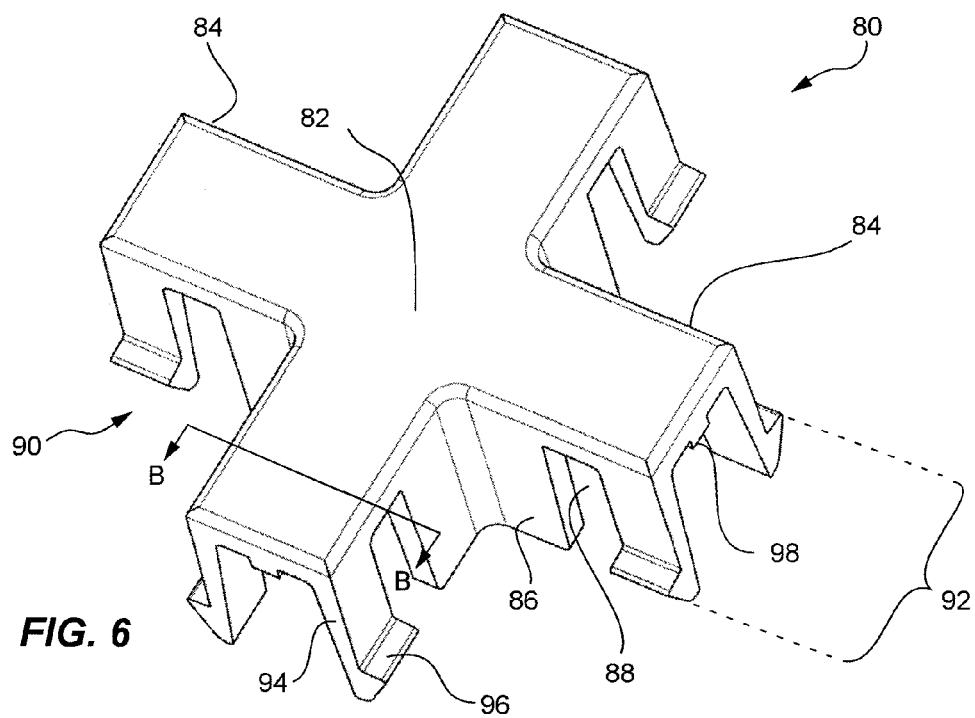
FIG. 6 is a perspective view of a bridge connector; in accordance with the embodiment of FIG. 1.
Figure 7A:
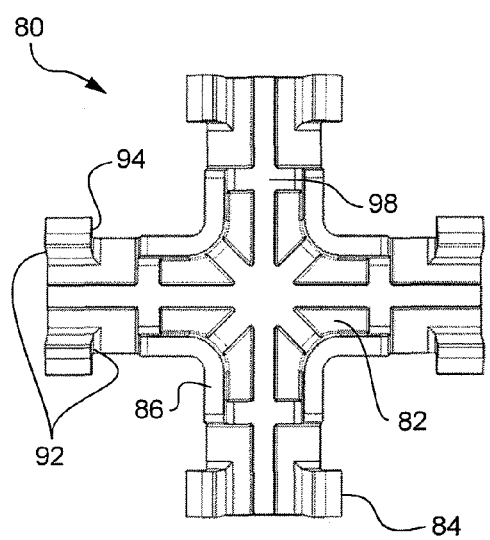
FIGS. 7A-7C together illustrate the top, side and cross-sectional (as taken through section line B-B) views of the bridge connector of FIG. 6.
Figure 7B:
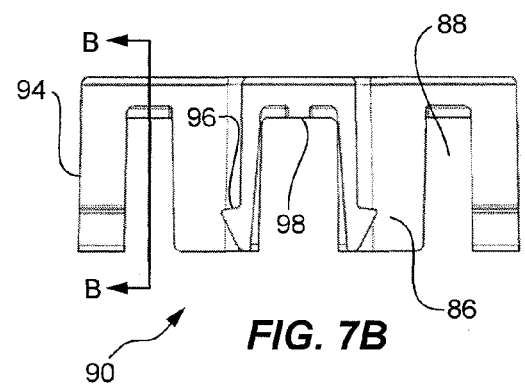
Figure 7C:
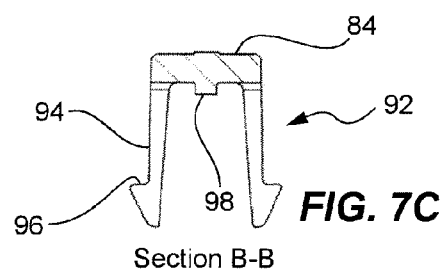

FIG. 6 is a close-up perspective view of the bridge connector 80, also in accordance with the modular sub-floor system of FIG. 1. As illustrated, a tile connection interface 90 can be formed into the center body 82 and arms 84 of the bridge connector, and can include upwardly-facing tip bearing surfaces 96 located near the tips of each of a pair of downwardly extending fingers (i.e., vertical engagement members) 94 that together form an end clip 92. As further illustrated in FIGS. 7A-7B and FIG. 7C (as viewed from Section Line B-B), end clips 92 extend downwardly from the ends of each of the four arms 84 that project radially outward from the center body 82 of the bridge connector 80. Furthermore, a set of skirts (i.e., also vertical engagement members) 86 can extend downwardly from the center body having a corner radius and thickness matching the radius and width of the corner pockets, and with a vertical notch 88 separating the skirts 86 and the end clips 92. An underside bearing surface 98 can be located interior to each skirt 86 and can operate as one complimentary surface of the tile connection interface 90 that engages with the pocket top of the first connection interface described above.

Figure 8A:
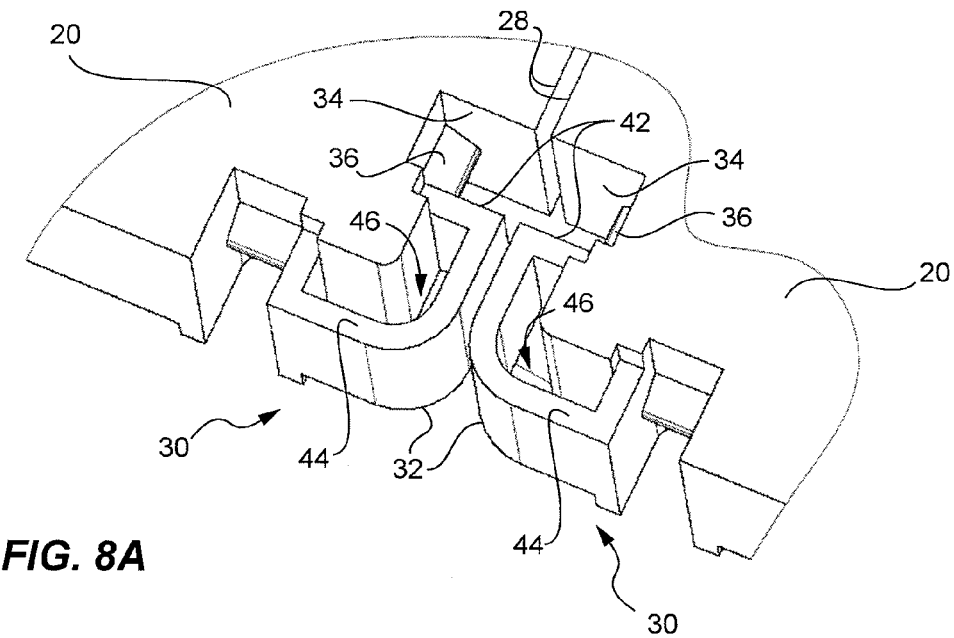
FIGS. 8A-8B together illustrate close-up perspective view of two adjacent floor/sub-floor tiles of FIG. 1, with and without a bridge connector.

The non-rigid bridging interconnection 14 between the first connection interface 30 (formed into the sub-floor tile 20) and the tile connection interface 90 (formed into the bridge connector 80) is shown in more detail in FIGS. 8A-8B and 9A-9B. Referring first to FIG. 8A, two or more sub-floor tiles 20 can be aligned adjacent to each other (either by being placed next to each other or by using an alignment interconnection) so that the structural features of the respective first connection interfaces 30 formed into the corners 32 of each sub-floor tile 20 are substantially aligned with each other. Thus, adjacent corner slots 34 line up together to form a rectangular hole configured to receive an end clip of a bridge connector, and adjacent pocket walls 42 line up together so that pocket top bearing surfaces 44 of the corner pockets 40 form a cross-shaped structure that mirrors the underside of the central body and arms of the bridge connector (see FIG. 7A). Additionally, the pocket recesses 46 are positioned close together to receive the skirts extending downwardly from either side of the central body of the bridge connector, while the sides of the pocket walls 42 next to the corner slots 34 are arranged so as to slide into the vertical notches separating the skirts from the end clips of the bridge connector.

Figure 8B:
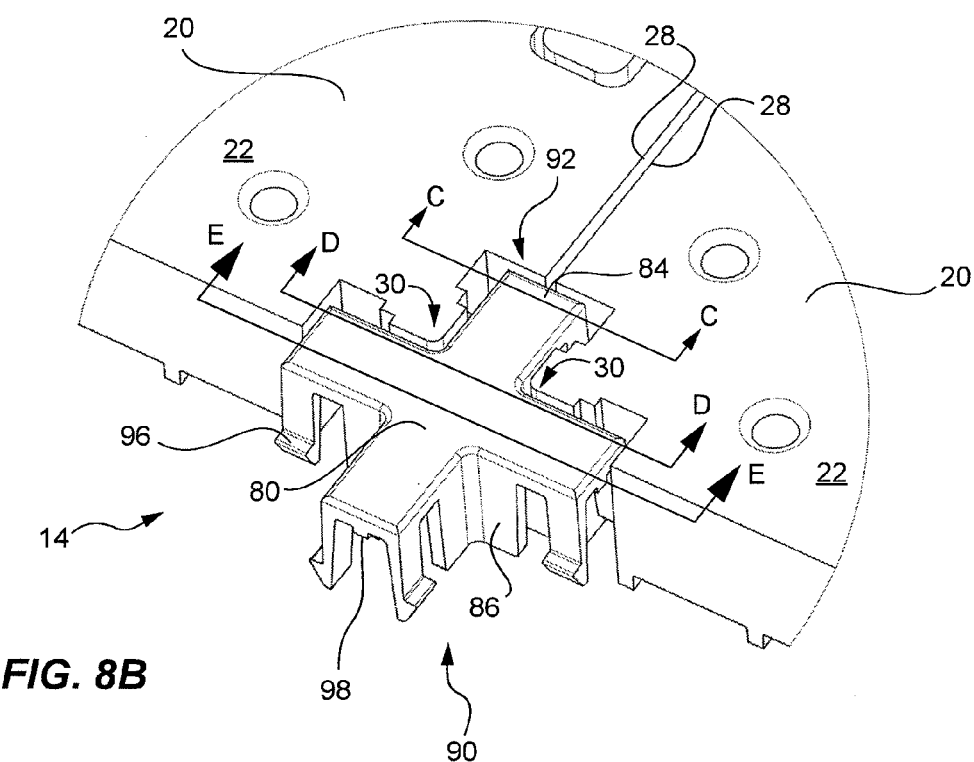

As shown in FIG. 8B, one end clip 92 and two skirts 86 of a bridge connector 80 can then be inserted, respectively, into the combined corner slots and pocket recesses of the two first connection interfaces 30, so that the complimentary engagement surfaces of the tile connection interface 90, namely the upwardly-facing tip bearing surfaces 96 and the downwardly-facing underside bearing surface 98, engage with the opposing engagement surfaces of the first connection interfaces on both sub-floor tiles and couple the bridge connector 80 to the sub-floor tiles 20.

Figure 9A:
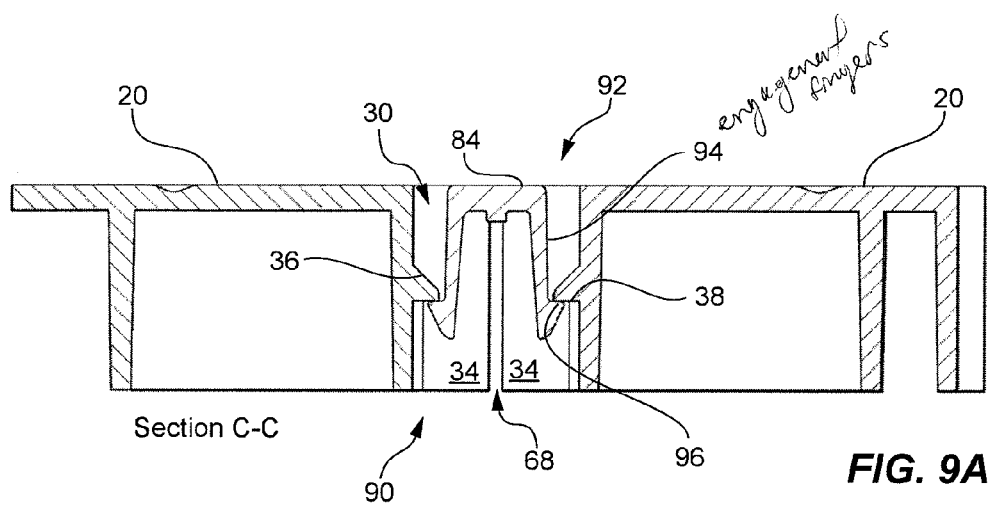
FIGS. 9A-9B together illustrate cross-sectional views of the coupled floor/sub-floor tiles and bridge connector of FIG. 8B, as taken through section line C-C and section line D-D, respectively.

In a cross-sectional view taken along Section Line C-C and depicted in FIG. 9A, for instance, the end clip 92 can be inserted into the aligned corner slots 34 described above until the tips of the flexible fingers 94 contact the locking tabs 36 projecting from the sides of the corner slots. Continued downward pressure can cause the fingers to flex inwards until the notched ends slide all the way past the locking tabs and the fingers snap back toward their normal positions, allowing both of the tip surfaces 96 to engage with the tab surfaces 38 of the locking tabs 36. As can be appreciated, not only do the tip surfaces 96 and tab surfaces 38 provide one of the two engagement interfaces of the bridging interconnection 14, but the outwardly-directed preload provided by the flexible fingers can also serve to secure the bridge connector in place until forcibly removed.

Figure 9B:
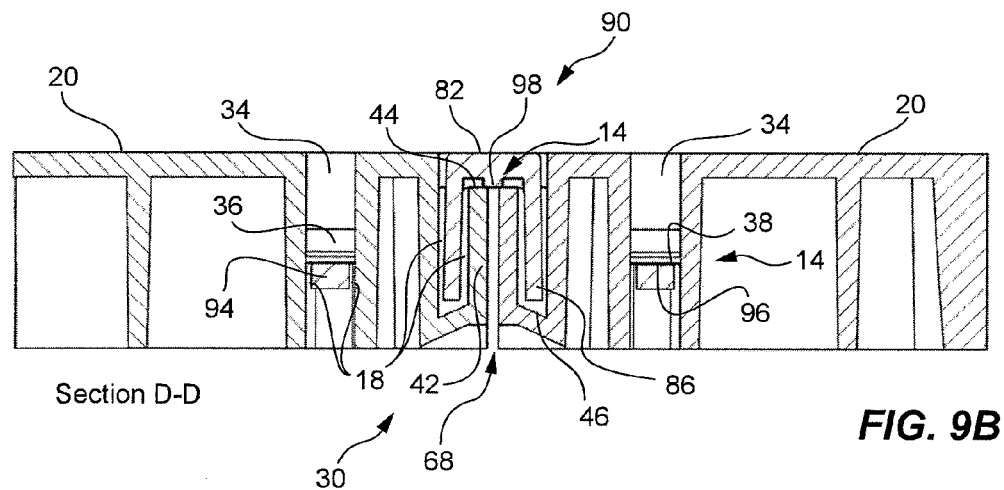

Both engagement interfaces of the bridging interconnection 14 can be seen in the cross-sectional view taken along Section Line D-D and depicted in FIG. 9B, and is located where the adjacent pocket tops 44 contact the underside surface 98 of the bridge connector. During installation, the skirts 86 of the bridge connector can slide freely into the pocket recesses 46 at the same time as the end clips are inserted into the aligned corner slots 34 and the tips of the fingers 94 engage with the locking tabs 34. Thus, it can be seen that the horizontal tip surface 96 tab surface 38 engagement interface combined with the horizontal pocket top 44 underside surface 98 engagement interface form a bridging interconnection 14 that restrains the relative vertical movement between the sub-floor tiles. In other words, a vertical elevation change about an upper side edge of one of the sub-floor tiles translates into a corresponding elevation change of the adjacent upper side edge of the adjacent sub-floor tile. Moreover, the bridging interconnection 14 can restrain the relative vertical movement in both directions and without an anchor or supplementary connection to the underlying ground surface.

Referring back to FIGS. 8A-8B, the phrase "a vertical elevation change about an edge" as defined herein can be synonymous with an inclination and/or vertical elevation change about an edge 28, or an elevation change about a corner 32. Moreover, the type of change can depend on the location of the bridge connector along the perimeter of the sub-floor tile. With the bridge connectors centered about corners, for instance, an elevation change in one corner can translate into a corresponding elevation change in the adjacent (e.g. proximate) corners of the three adjacent sub-floor tiles, with the elevation/inclination of the connected edges following suit. With the bridge connectors centered about a sidewall, an elevation and/or inclination change about an edge can translate into a corresponding elevation and/or inclination change in the adjacent (e.g. proximate) edge of the adjacent floor tile, with the elevation of the connected corners following suit.

In one aspect the bridge connector 80 can be made from a moderately bendable or flexible synthetic material that permits each arm 84 of the bridge connector to flex slightly. This flexibility can allow the bridging interconnection 14 to restrain the relative vertical movement between the sub-floor tiles in a non-rigid manner while continuing to maintain a substantially smooth top surface alignment across adjacent edges and despite any variations in the angular orientation or tilt of the individual sub-floor tiles.

Also illustrated in FIG. 9B are a plurality of first clearance gaps 18 which can separate the vertical surfaces of the sub-floor tile's 20 first connection interfaces 30 and vertical surfaces of the bridge connector's 80 tile connection interface 90, even as the opposing horizontal surfaces 38,96 and 44,98 are held in close contact with each other to form the engagement interfaces of bridging interconnection 14. As stated previously, the first clearance gaps 18 between the various parts can allow the bridging tile connecter and the sub-floor tiles to shift and move laterally within the bridging interconnection 14 in a controlled manner (e.g. until the vertical surfaces contact each other and prevent further movement between the sub-floor tiles). Additionally, the first clearance gaps can also accommodate moderate variations in the angular orientation or tilt between adjacent sub-floor tiles. In a representative embodiment, the first clearance gaps 18 can range from 1/16 inch up to and including 3/16 inch.

Again referring back to FIGS. 8A-8B, it can be seen that the aligned structures of the first connection interfaces formed into the corners of the adjacent sub-floor tiles can combine to form a recessed region into which the central body 82 and arms 84 of the bridge connector can be received, so that the top surface of the installed bridge connector can be positioned flush or below the top surfaces 22 of the sub-floor tile 20. Locating the bridge connector flush or below the top surfaces of the sub-floor tiles provides a smooth and unbroken surface for supporting the various overlayments described above.

Figure 10:
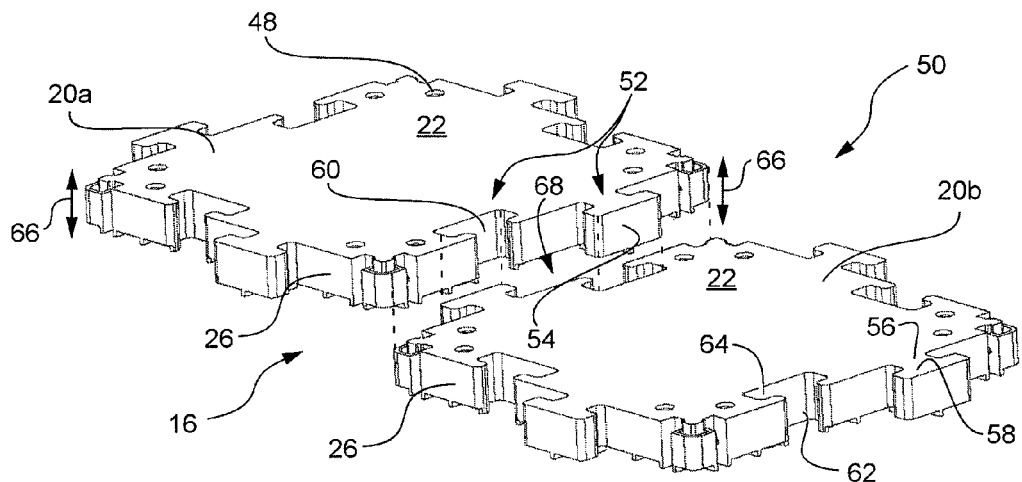
FIG. 10 is an exploded perspective view of the second connection interface; in accordance with the embodiment of FIG. 1.

Illustrated with more detail in FIG. 10 is the second connection interface 50 formed into the sub-floor tiles 20a, 20b of the modular sub-flooring system 10 which can be used to establish an alignment interconnection between adjacent sub-floor tiles 20a, 20b (see also FIG. 1). The alignment interconnection can operate to correctly position the sub-floor tiles relative to each other for subsequent installation of the bridge connectors, and to maintain the controlled relative lateral movement provided in the bridging interconnection described above. For example, the second connection interface 50 can comprise a pair of complimentary puzzle pieces 52 that includes a T-shaped, outwardly-projecting tab 54 (comprising a crosspiece 58 attached to a neck 56) and a corresponding T-shaped, inwardly-extending cut-out 60 (defined by a gap 62 leading to a cross-slot 64). Pairs of puzzle pieces can be formed into each sidewall 26 of the sub-floor tile 20, and can slide into matching pairs of puzzle pieces formed into the adjacent sub-floor tiles during assembly of the modular sub-flooring system (see FIG. 1). While generally formed into the shape of a "T" bar and a "T" slot, respectively, the tabs 54 and cut-outs 60 can comprise a variety of shapes and sizes, and are not restricted or limited to the shapes and sizes shown in the drawings.

The interconnecting puzzle pieces 52 can be sized so that the tabs 54 fits loosely within the cut-outs 60 to maintain the second clearance gap 68 between the sidewalls 26 and second connection interfaces 50 of the sub-floor tiles 20a, 20b. The second clearance gap can be complimentary with the plurality of first clearance gaps found in the bridging interconnection, and can also provide for the thermal expansion and contraction of the individual sub-floor tiles with their own footprints and without binding against the sidewalls of an adjacent tile. In a representative embodiment, the second clearance gap can range from 1/16 inch up to and including 5/16 inch, and may vary along the sides of the sub-floor tile. For instance, the clearance gap between outer walls of the tabs 54 and the inner walls of the cut-outs 60 may be greater or less than the clearance gap between adjacent sidewalls 26, it so desired.

As an additional benefit, the clearance gap 68 separating the sub-floor tiles 20a, 20b can also provide a drainage path to ground for rainwater and other liquids which may flow downwards from a permeable overlayment, such as a synthetic sports flooring configuration with a porous upper surface. The clearance gap can also provide a limited volume for the temporary storage of the rainwater until it can evaporate or be absorbed by the ground surface. Drain holes 48 formed through the top surfaces 22 of the sub-floor tiles 20a, 22b can also provide drainage paths to the underlying ground surface.

Also illustrated in FIG. 10 is a method for assembling (or disassembling) one sub-floor tile 20a to an adjacent sub-floor tile 20b along a vertical axis, to respectively create (or break) the non-rigid interconnection that substantially aligns the sub-floor tiles together over the ground surface. Specifically, the second connection interfaces 50 of each sub-floor tile can slide into or out of the second connection interfaces of the adjacent sub-floor tiles with only a vertical motion component 66, or without a horizontal motion component, so that any individual sub-floor tile can be attached or removed from the sub-flooring system 10 without laterally displacing the adjacent sub-floor tiles. In other words, the top surface 22 of any sub-floor tile 20 can be configured to not extend over a bottom surface an adjacent sub-floor tile and so prevent the vertical removal of the adjacent sub-floor tile.

Likewise, the bridge connectors 80 can also assemble to the sub-floor tiles 20 along a vertical axis (see FIG. 1), and without a horizontal motion component, so that any individual bridge connector can be attached or removed from the modular sub-flooring system 10 without the lateral displacement of the sub-floor tiles to which it interconnects. This vertical assembly/disassembly aspect, both between the bridge connectors and the sub-floor tiles and between the sub-floor tiles themselves, can be advantageous by allowing for the selective removal and replacement of any individual sub-floor tile or bridge connector without affecting the remainder of the sub-flooring system. Thus, if a sub-floor tile or bridge connector becomes worn or fails over time or is damaged during use, that component can be easily removed and replaced without the unnecessarily removal and/or replacement of the adjacent components. Additionally, if a portion of the earthen ground surface supporting the sub-flooring system washes out or shifts after assembly of the sub-flooring system, only the affected sub-floor tiles 20 need be temporarily removed so that repairs to the problem area can be made without the costly take-up and replacement of a larger portion sub-flooring system than is necessary.

It is to be appreciated, however, that in some embodiments the bridge connector may be substantially non-removable from the sub-floor tiles after installation, and can be locked into position using a variety of self-locking structures or auto-locking devices, etc. The may be desirable so as to preclude the unauthorized disassembly of the sub-flooring system or to build a lower-cost sub-flooring system that is substantially disposable, etc.

Figure 11:
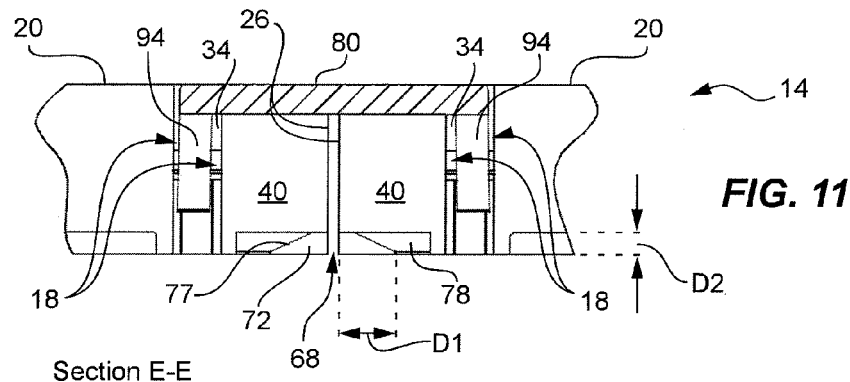
FIG. 11 is a cross-sectional view of two adjacent sub-floor tiles coupled together with the second connection interface, as taken through section line E-E of FIG. 8B.

FIG. 11 is a cross-sectional view of the bridging interconnection 14 as taken through section line E-E of FIG. 8B, and serves to illustrate an optional underside bevel 77 which can be formed into the underside of the corner pockets 40. The bevel can extend downward from the raised corners of the sub-floor tile until reaching the perimeter support ribs 78. Also shown in FIG. 11 are the laterally extending support ribs 72 which extend all the way underneath the sidewalls 26 to provide complete load bearing support to the top surface of the sub-floor tiles 20. As described above, in one aspect the perimeter support ribs 78 running underneath and parallel to the outer edges of the sub-floor tile 20 can be set back a distance D1 from the sidewalls 26 and corners, and the bottom edge of the sidewalls 26 lifted (or tapered) a distance D2 above the ground surface, to provide more space (i.e., a channel) beneath the outer edges, the corners, and the second connection interfaces. In one exemplary embodiment D1 can range from about 0.25 inch to 1.0 inch, and D2 can range from about 0.25 inch to 0.5 inch. This channel is advantageous to accommodate for the shifting, build-up or displacement of the ground surface, or for the placement of electrical or fluid conduit, or other sub-floor devices as suits a particular purpose. Advantageously, the channel which is formed about the perimeter of tiles during construction, allows for easier installation of conduit or other devices within the channel. In particular, once a tile is placed upon the ground, half of the channel is formed wherein a conduit may be placed. A corresponding adjacent tile may then also be placed upon the ground enclosing the placed conduit.

Also shown in FIG. 11 are the plurality of first clearance gaps 18 between the vertical surfaces of the first connection interface, such as the clearance gaps found between the fingers 94 of the bridge connector and the inside walls of the corner slots 34. The first clearance gaps 18 can operate together with the second clearance gap 68 located between the sidewalls 26 of the adjacent sub-floor tiles 20 to facilitate the controlled relative lateral movement between the sub-floor tiles.

Figure 12:
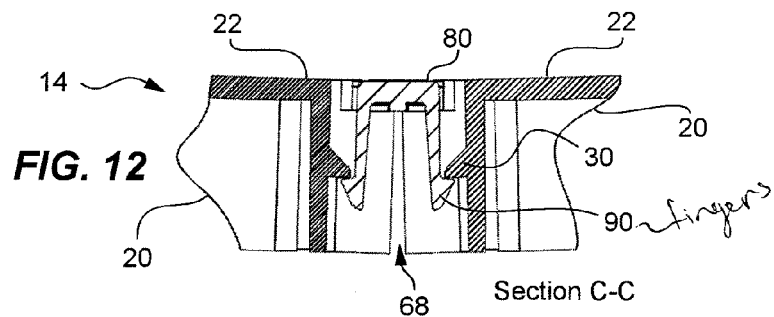
FIG. 12 is a cross-sectional view of two tilted sub-floor tiles coupled together with the second connection interface, as taken through section line C-C of FIG. 8B.

In accordance with the representative embodiment of the modular sub-flooring system shown in FIGS. 1-11, any adjacent sub-floor 20 tiles may or may not directly contact each other, but instead can be interconnected to each other through the bridge connector 80 that forms the non-rigid bridging interconnection 14. Because the bridging interconnection is non-rigid, adjacent sub-floor tiles can have different angular orientations, or tilt, with respect to each other, as illustrated in FIG. 12. In other words, each sub-floor tile can be individually tiltable even as the first connection interface 30 and the tile interface 90 engage with each other to restrain relative vertical movement and maintain a substantially smooth (albeit bent or angled) top surface alignment across adjacent edges of the top surfaces 22 of the sub-floor tiles. Thus, there are no vertical discontinuities or steps as one moves from one sub-floor tile to another even as the overall modular sub-flooring system substantially conforms to undulations in the ground surface. In such tilted situations the second clearance gap 68 formed between adjacent sidewalls of the sub-floor tiles can converge or diverge between top and bottom, as also shown in FIG. 12.

In accordance with another representative embodiment, FIGS. 13A and 13B illustrate a flooring system 100 comprised of an overlayment 130 installed over a previously-assembled modular sub-flooring system 110. The sub-flooring system is made from a plurality of modular sub-floor tiles 120 interconnected together with bridge connectors 180 over a ground surface 102. The overlayment 130 can be a synthetic sports flooring configuration assembled from a plurality of interlocking modular floor tiles 140.

Each sub-floor tile 120 has a top surface 122 that supports the overlying sports flooring configuration, a bottom plane 124 that interfaces with the ground surface 102, and a plurality of brace members 126 that form the primary load bearing structure between the top surface of the sub-floor tile and the ground surface. The plurality of brace members is configured with a sub-flooring impact-absorbing characteristic which can absorb impact forces transferred from the overlying sports flooring configuration. In the representative sub-flooring system 110 described above, the plurality of brace members 126 can be a grid of intersecting support ribs coupled to or integrally-formed with the underside surface of the flat panel that provides the top surface 122 of the sub-floor tile 120, and with the bottom edges of the support ribs defining the bottom plane 124 of the sub-floor tile.

During assembly the sub-floor tiles 120 can be loosely aligned together using an alignment interface, such as the pair of complimentary puzzle pieces described in previous embodiments, or may simply be placed next to each other over the ground surface 102. The plurality of modular sub-floor tiles are then coupled together with a plurality of bridge connectors 180 to create the non-rigid bridging interconnections 114 between adjacent sub-floor tiles that facilitate controlled relative lateral movement while restraining relative vertical movement between adjacent sub-floor tiles. Thus, the bridge connectors 180 can operate to maintain a substantially smooth top surface 122 alignment across adjacent sub-floor tile edges 128 even when, for example, the sub-floor tile is located over a supporting ground surface 102 having surface variations or undulations, or where portions of the ground surface have been removed in a wash-out 104, etc.

A variety of overlayments can be installed over the modular sub-flooring system 110 to form various embodiments of the completed flooring system 100 described herein, including one or more layers of segmented or rollable padding, indoor/outdoor carpet, artificial grass, AstroTurf™, padded athletic mats (e.g. such as those as used for gymnastics), artificial track surfaces, etc., as well as a variety of natural and artificial flooring configurations. Although the modular sub-flooring system 110 may be particularly suitable for supporting sports flooring configurations, nothing should be construed from the detailed description and accompanying drawings as limiting the use and application of modular sub-flooring system to the specific flooring configurations described herein. Indeed, it is to be appreciated that the modular sub-flooring system 110 can serve as a replacement for any flooring configuration support system, including concrete, asphalt, brick, ceramics, plastics, wood, metal, and/or prepared ground surfaces, etc., and which provide a smooth and uniform support surface for a wide variety of flooring overlayments.

Nonetheless, as illustrated in FIGS. 13A-13B, the modular sub-flooring system 110 can be combined with a synthetic sports flooring configuration 132 to form a flooring system 100 that is suitable particularly for sports play such as basketball, volleyball and tennis, etc., which involve bouncing balls combined with player-related impacts and forces resulting from running, sliding, falling, jumping, landing and braking, etc. For instance, one exemplary synthetic sports flooring configuration that is assembled from a plurality of interlocking modular floor tiles, and which is adaptable for installation over the modular sub-flooring system 110, is described and illustrated in United States Patent Application Publication No. 2005/0193669, filed Feb. 24, 2005, and entitled "Modular Tile With Controlled Deflection", which publication is incorporated by reference in its entirety herein.

Similar in some respects to the modular sub-flooring system below, the modular sports flooring tiles 140 have a top or contact surface 142 configured to interact with the players and/or bouncing balls and receive impacts thereon, a base plane 144 for contacting and being supported by the sub-flooring system 110, and an intermediate structure or force transfer element 146 having its own flooring impact-absorbing characteristic. Thus, the force transfer element absorbs at least a portion 162 of an impact force 160 imparted to the contact surface and transfers the remainder 164 to the sub-flooring system below. In the representative sports flooring configuration described above, for instance, the force transfer element 146 can comprise an array of supporting ribs and posts that flex to absorb the first portion of an impact face while transferring the remainder of the impact force to the top surface 122 of the sub-floor tile 120 below. In turn, after being received by the underlying sub-floor tile 120 the remainder of the impact force 164 is absorbed by the impact-absorbing characteristic of the plurality of brace members 126 and/or transferred to ground.

In one aspect illustrated in FIGS. 13A-13B, a shock or impact absorption distribution ratio between the impact absorbing characteristic of the overlayment 130 and the impact absorbing characteristic of the sub-flooring system 110 can be configurable and selectable so as to optimize or tailor the various performance parameters provided by the complete flooring system 100. These parameter can include, but are not limited to, the overall flooring system's coefficients for impact absorption and ball bounce. It is to be appreciated that adjustments in the ratio between the two impact absorbing characteristics can affect both performance parameters.

The non-rigid bridging interconnection 114 created between the sub-floor tiles 120 and the bridge connectors 180 can include a clearance gap 128a separating adjacent sub-floor tiles that facilitates the controlled relative lateral movement between the sub-floor tiles. Although the bridging interconnection operates to maintain the top surface 122 alignment across adjacent edges 128 despite variations in the underlying ground surface 104, the internal lateral play in the interconnection and the flexibility of the bridge connector 180 itself may combine to limit the transfer of impact forces across tile boundaries to an adjacent sub-floor tile, further defining each sub-floor tile as an impact isolation panel. As shown with impact force 160 in FIG. 13A, an impact force remainder 164 received by any individual sub-floor tile 120 (or impact isolation panel) can be primarily absorbed or transferred to ground by that same sub-floor tile. Likewise, if an impact force 170 happens to be located above a boundary or clearance gap 128b between two sub-floor tiles 120, as illustrated in FIG. 13B, at least a portion 172 of the impact force is absorbed by the force transfer element 146 of the sports floor tile with the remainder of the impact force 174 can being proportionately distributed to both sub-floor tiles 120 directly below the impact site. Thereafter, the distributed force remainders 174 can be limited to each sub-floor tile, since the clearance gap 128b may operate to prevent the subsequent distribution of the force to any other sub-floor tile.

FIGS. 13A-13B further illustrate the capacity of the modular sub-flooring system 110 for controlled relative lateral movement between the sub-floor tiles 120, such as the lateral movement resulting from thermal expansion/contraction of the individual tiles, while continuously providing support for the overlayment 130 installed above. As can be seen, the gaps 128a of FIG. 13A are substantially greater than the gaps 128b of FIG. 13B, demonstrating the capacity of the sub-flooring system 110 to accommodate the thermal contraction (FIG. 13A) and expansion (FIG. 13B) of the synthetic sub-floor tiles within their own footprints, so as to respond to variations in the ambient temperature without becoming bound within the coupling interface 114.

The representative synthetic sports flooring configuration 132 made from a plurality of interlocking modular floor tiles 140 can also have joints 148a, 148b which open and close slightly in response to minor changes in the surrounding environment. In one aspect the overlayment 130 may not be anchored to the sub-flooring system 110 and instead may be free to "float" laterally over the sub-flooring system's top surface. Thus, differences in the coefficients of thermal expansion between the sub-flooring system and overlayment can also be accommodated by allowing the entire overlayment 130 to shift back and forth over the sub-flooring system 110 as it responds to larger swings in the surrounding ambient temperature.

Figure 14:
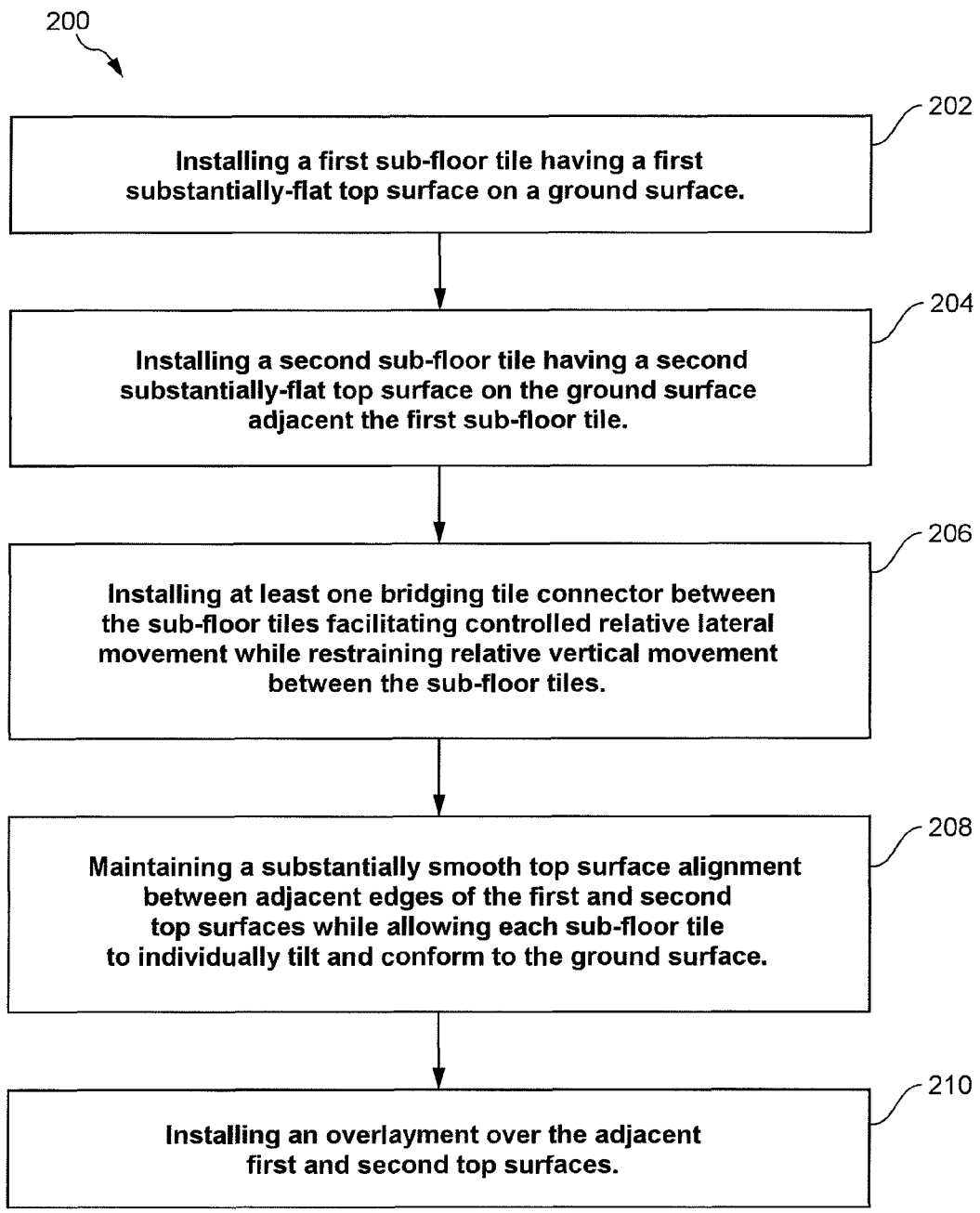
FIG. 14 is a flowchart depicting a method for preparing a modular sub-flooring system for supporting an overlayment above a ground surface, in accordance with another representative embodiment.

Referring now to FIG. 14, illustrated therein is a flowchart depicting a method 200 for installing an overlayment above a ground surface (such as the overlayment 130 installed over the ground surface in 102 shown in FIGS. 13A-13B) and in accordance with a representative embodiment. The method 200 includes the steps of installing 202 a first sub-floor tile having a first substantially-flat top surface on a ground surface, and installing 204 a second sub-floor tile having a second substantially-flat top surface on the ground surface adjacent the first sub-floor tile. Both the first and second sub-floor tiles can be substantially identical modular sub-floor tiles that assemble together to form part of a sub-flooring system. Furthermore, the sub-floor tile may or may not include a non-rigid alignment interconnection that allows the second sub-floor tile to be assembled to the first sub-floor tile along a vertical axis to facilitate individual removal and replacement of any sub-floor tile without displacement of the adjacent sub-floor tile, and which positions the sub-floors tiles next to each other and in a proper orientation for additional assembly.

The method also includes the step of installing 206 one or more bridge connectors between the sub-floor tiles to form a non-rigid bridging interconnection that facilitates controlled relative lateral movement while restraining relative vertical movement between the sub-floor tiles. The bridge connector can also assemble to the sub-floor tiles along a vertical axis, and without a horizontal motion component, so that any individual bridge connector can be attached to or removed without the lateral displacement of the sub-floor tiles to which it interconnects.

The method also includes the step of maintaining 208 a substantially smooth top surface alignment between the adjacent edges of the first and second top surfaces while allowing each sub-floor tile to individually tilt and conform to undulations in the ground surface. In one aspect the capability for the individual sub-floor tiles to tilt with respect to each other is provided by a plurality of first clearance gaps between the vertical surfaces of the bridging interconnection that are sufficiently large to accommodate small lateral movements between the adjacent sub-floor tiles, such as those caused by thermal expansion and contraction, shifts in the underlying ground surface, and from impacts or steady-state forces transferred from the overlayment above.

The method further includes the step of installing 210 installing an overlayment over the adjacent first and second top surfaces. Many types of overlayments can be used with the first and second sub-floor tiles pre-assembled together with one or more bridge connectors, as described above, to form a modular sub-flooring system. However, the sub-flooring system may be particularly suitable for supporting a sports flooring configuration assembled from a plurality of interlocking synthetic modular floor tiles. Thus, the modular sub-flooring system and the sports flooring overlayment can together form a flooring system that is suitable particularly for sports play involving bouncing balls and/or the player-related impacts and forces that result from running, sliding, falling, jumping, landing and braking, etc.

Figure 15:
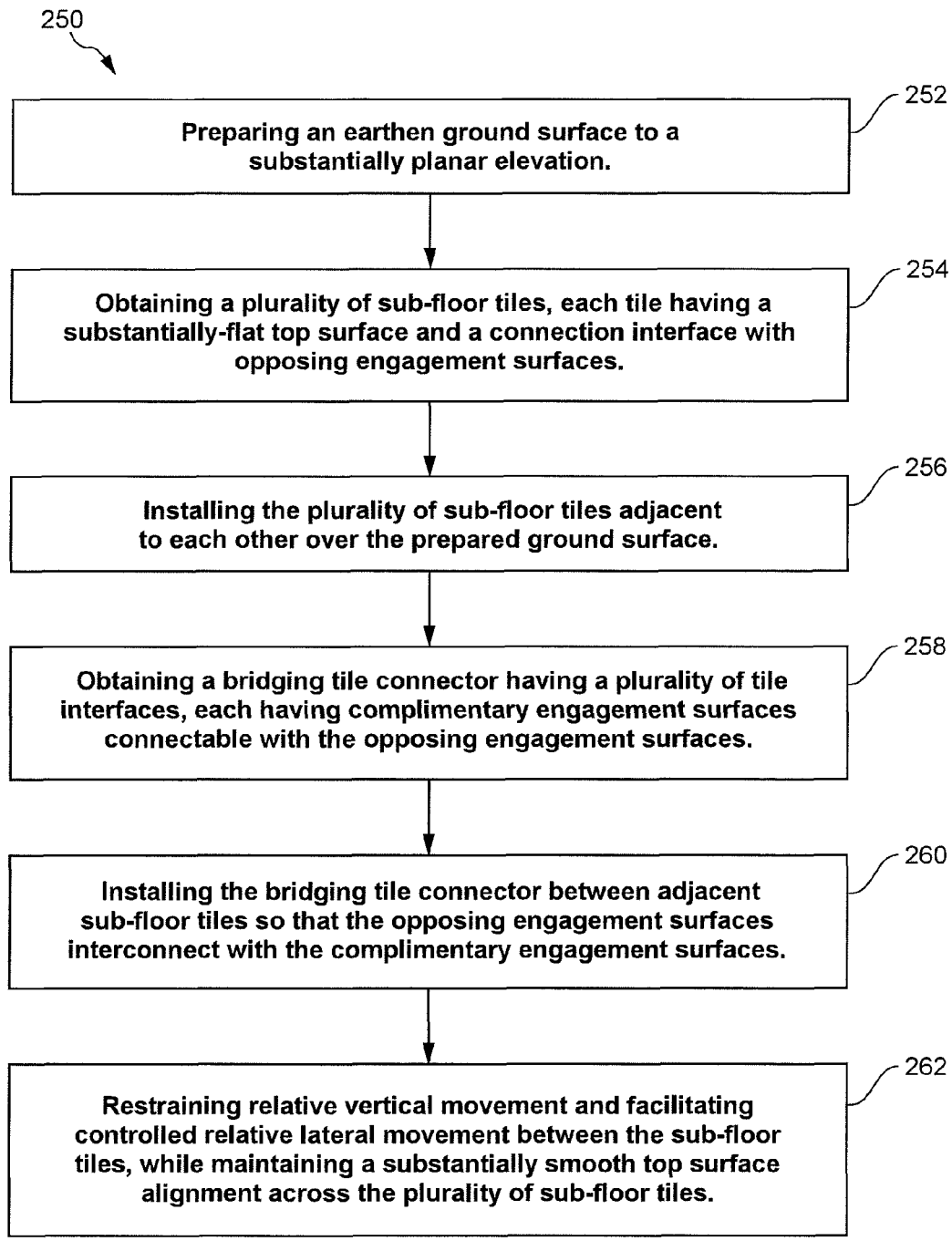
FIG. 15 is a flowchart depicting a method for installing an overlayment above a ground surface, in accordance with yet another representative embodiment.

Illustrated in FIG. 15 is flowchart depicting a method 250 for installing an overlayment above a ground surface, in accordance with another representative embodiment. The method 250 includes the step of preparing 252 an earthen ground surface to a substantially planar elevation. The method also includes obtaining 254 a plurality of sub-floor tiles, with each sub-floor tile having a substantially-flat top surface adapted to receive and support an overlayment and at least one connection interface with opposing engagement surfaces, and installing 256 the plurality of sub-floor tiles adjacent to each other over the prepared earthen ground surface. Installing the plurality of sub-floor tiles may include using a non-rigid alignment interconnection that has been formed into each sub-floor tile, and which is adapted to align adjacent tiles relative to one another while still allowing for the thermal expansion and contraction of each sub-floor tile within its own footprint.

The method 250 also includes obtaining 258 one or more removable bridge connectors having a plurality of tile interfaces, and with each tile interface having complimentary engagement surfaces connectable with the opposing engagement surfaces, and installing 260 the bridge connector(s) between adjacent sub-floor tiles so that the opposing engagement surfaces of the tiles interconnect with the complimentary engagement surfaces of the connectors. In one aspect the bridge connector(s) can assemble to the sub-floor tiles along a vertical axis, and without a horizontal motion component, so that any individual bridge connector can be attached to or removed without the lateral displacement of the sub-floor tiles. Moreover, the plurality of sub-floor tiles can also be assembled together along the vertical axis to facilitate the individual removal and replacement of any sub-floor tile without displacement of the adjacent sub-floor tile.

The method 250 further includes restraining 262 the relative vertical movement while allowing for the controlled relative lateral movement between the sub-floor tiles, and maintaining a substantially smooth top surface alignment across the plurality of sub-floor tiles despite a variation in the angular orientation of any individual sub-floor tile.

Figure 16A:
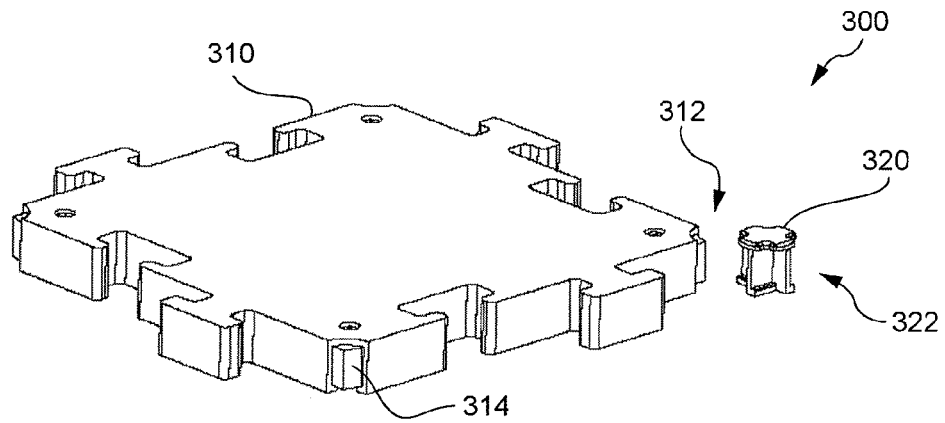
FIGS. 16A-16C together illustrate perspective and top views of a disassembled and assembled modular flooring/sub-flooring system, in accordance with another representative embodiment.
Figure 16B:
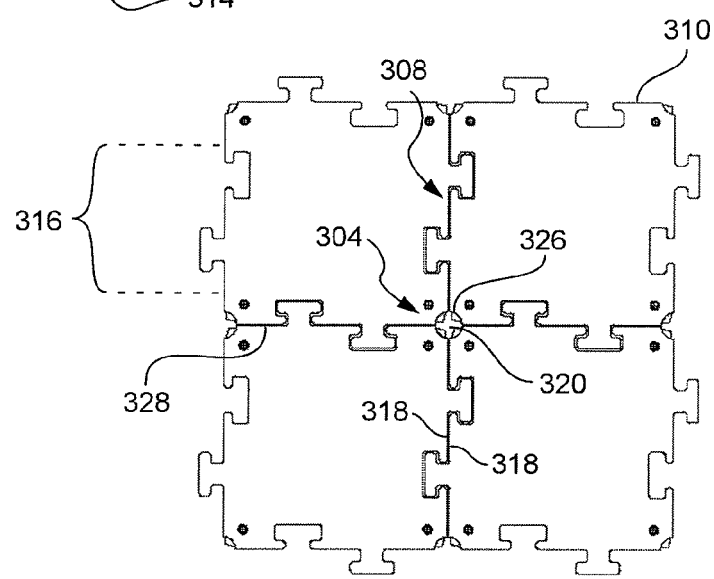
Figure 16C:
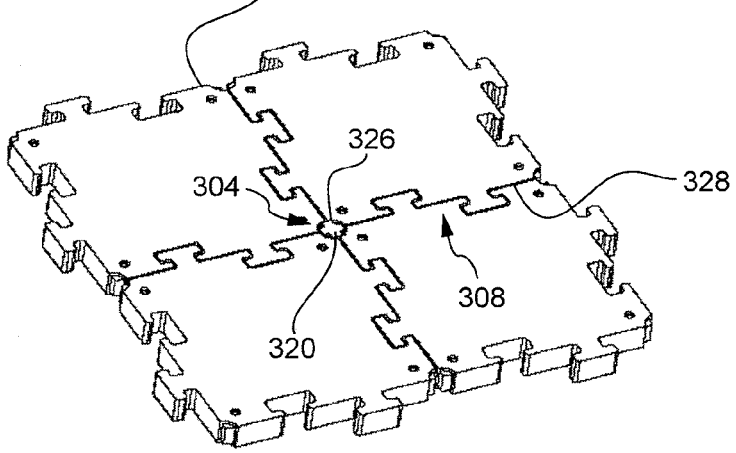

Referring back to FIGS. 1-12, the representative embodiment of the modular sub-flooring system 10 illustrated therein uses one or more bridge connectors 80 with end clips that 'snap' into a corresponding recesses formed into the corners of adjacent sub-floor tiles 20 to form the exemplary bridging interconnections 14. It is to be appreciated, however, that other configurations and techniques for creating a bridging interconnection between adjacent sub-floor tiles are also possible and can be considered to fall within the scope. For instance, as illustrated in FIGS. 16A-16C, the modular sub-flooring system 300 can include a twist-lock bridge connector 320 which can be inserted into a junction between several sub-floor tiles 310 and rotated to form a non-rigid bridging interconnection 304 that couples the sub-floor tiles together. The bridge connector 320 can include a plurality of tile connection interfaces 322 which engage with first connection interfaces 312 formed into the corners of the sub-floor tiles, such as a corner brace 314. Similar to the previous embodiment of the modular sub-flooring system described above, the bridging interconnection 304 can comprise opposing engagement surfaces in the first connection interfaces 312 which engage with complimentary engagement surfaces in the tile connection interface 322 to restrain relative vertical movement between the sub-floor tiles 310. Likewise, the bridging interconnection 304 can include a plurality of first clearance gaps 326 between vertical surfaces of the first and tile connection interfaces that facilitate controlled relative lateral movement between the sub-floor tiles while maintaining a substantially smooth top surface alignment across adjacent edges 318 of the top surfaces of the sub-floor tiles.

The modular sub-floor tiles 310 of the sub-flooring system 300 can also include a second connection interface 316, such as a pair of puzzle pieces, that forms a non-rigid alignment interconnection 308 between adjacent sub-floor tiles, and which facilitates the alignment and placement of the sub-floor tiles 310 adjacent to each other on the ground surface and prior to the attachment of the bridge connectors 320. Also similar to the previous embodiment described above, the alignment interconnection 308 of the modular sub-flooring system 300 can be configured with a second clearance gap 328 between the sidewalls and puzzle pieces of the sub-floor tiles that maintains the controlled relative lateral movement provided by the bridging interconnection 304. Moreover, the clearance gap 328 separating the sides of the sub-floor tiles can also provide a drainage path to ground, as well as a limited volume for the temporary storage of liquids before they can be absorbed by the ground surface.

Figure 17:
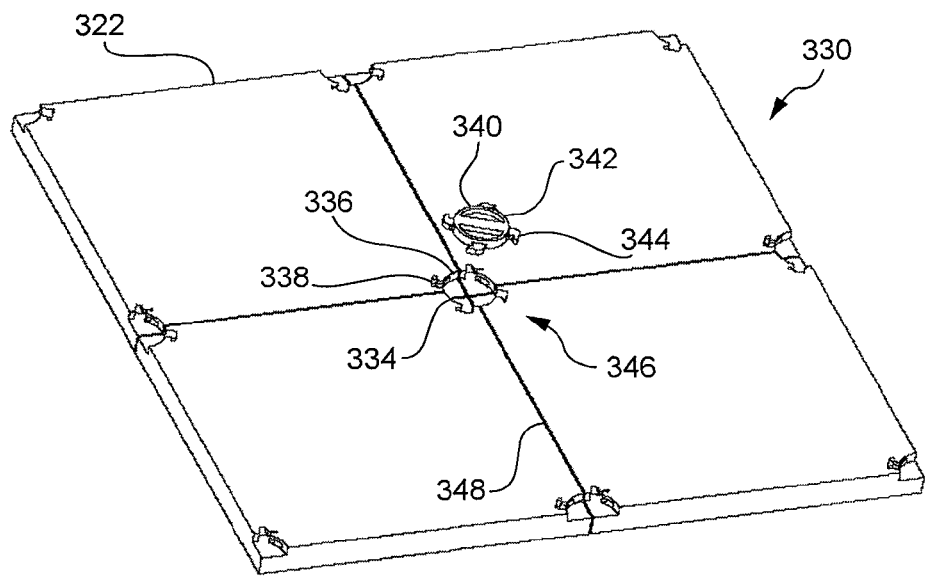
FIG. 17 is an exploded, perspective view of a modular flooring/sub-flooring system, in accordance with yet another representative embodiment.

Shown in FIG. 17 is modular sub-flooring system 330 in accordance with yet another representative embodiment. The sub-flooring system 330 can include a plurality of sub-floor tiles 332, each tile having a first connection interface 334 formed into the corners that comprises a quarter-circle recess 336 along with an access notch 338 and sub-surface engagement slot (not shown). With four sub-floor tiles assembled together the combined quarter-circle recesses 336 create a single circular recess adapted to receive the rounded body 342 of a twist-lock bridge connector 340 with hook tabs 344 that fit into the access notches 338. The bridge connector 340 can then be rotated to engage the hook tabs into the sub-surface engagement slots and form a bridging interconnection 346 that couples together the sub-floor tiles 332.

Like the modular-sub flooring systems described above, the non-rigid bridging interconnection 346 can include enough internal lateral clearance within the engagement slots and between the quarter-circle recesses and the round body 342 of the bridge connector to allow controlled relative lateral movement while still restraining relative vertical movement between the sub-floor tiles 332. Unlike the previous sub-flooring systems, however, the sub-floor tiles shown in FIG. 17 may not include a second connection interface used to form a non-rigid alignment interconnection. Instead, the sub-floor tiles can simply be placed next to each other so that the quarter-circle recesses 336 line up to form the single circular recess, and with a sufficient clearance 348 so as to avoid encroaching on or limiting the controlled relative lateral movement provided by the bridging interconnection 346.

Figure 18:
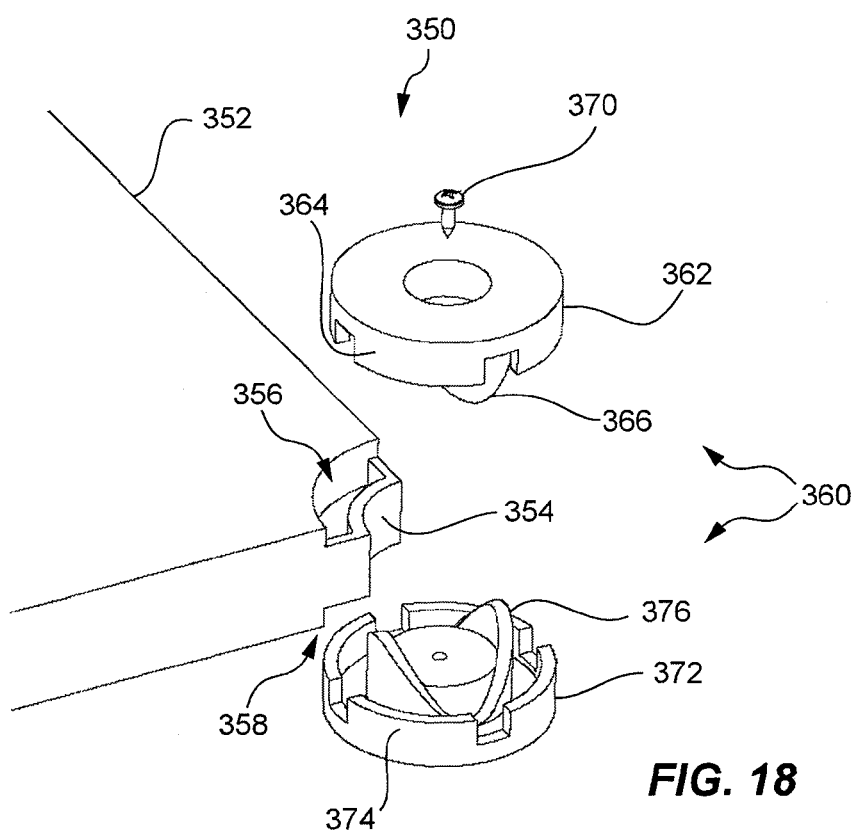
FIG. 18 is an exploded, perspective view of a modular flooring/sub-flooring system, in accordance with yet another representative embodiment.

Shown in FIG. 18 is modular sub-flooring system 350 in accordance with yet another representative embodiment. The sub-flooring system 350 can include a plurality of sub-floor tiles 352, with each tile having a first connection interface 354 formed into the corners that comprises a dual-sided corner pocket having an upper pocket recesses 356 and a lower pocket recess 358 formed into both ends of the connection interface. The bridge connector 360 can be split into an upper half 362 and a lower half 372. The upper half 362 of the tile connector can include a downwardly-extending skirt 364 which fits into the upper pocket recess 356, and an upper cam 366. Likewise, the lower half 372 of the tile connector can include an upwardly-extending skirt 374 which fits into the lower pocket recess 358, and a lower cam 376. The two halves of the bridge connector 360 can be assembled together around the first connection interfaces 354 and secured with a fastener or screw 370 to form a non-rigid bridging interconnection 378 that couples the sub-floor tiles together.

Upon assembly the upper cam 366 and lower cam 376 can engage with each other to restrict relative vertical movement between adjacent sub-floor tiles 352 while at the same time allowing for the controlled relative lateral movement and pivoting movement between the tiles. Thus, the non-rigid bridging interconnection 378 operates to maintain a substantially smooth top surface alignment between adjacent edges or corners of the top surfaces while still allowing each sub-floor tile to individually tilt and conform to the ground surface and/or expand or contract in place in response to variations in the ambient temperature. Even though the tile connector 360 is assembled in part from below, it still may be considered a bridge-style connector that bridges the gap between adjacent sub-floor tiles as it operates without an anchor or connection to ground to restrict relative vertical movement between the tiles in both directions.

Figure 19A:
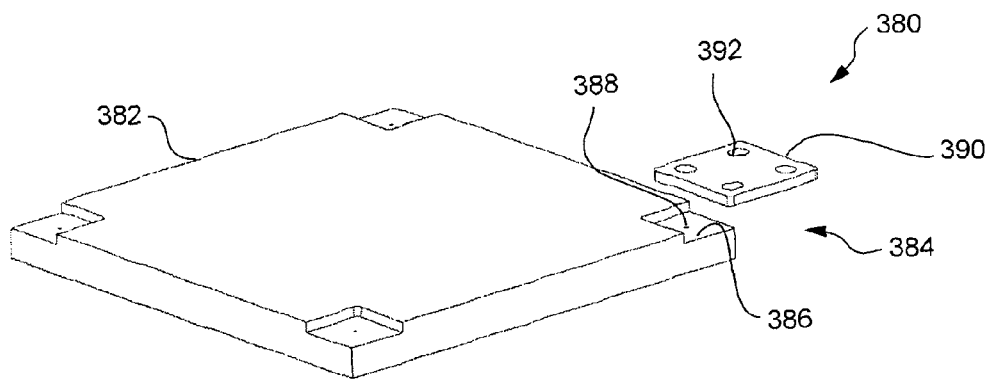
FIGS. 19A-19B together illustrate perspective views of an exploded and assembled modular flooring/sub-flooring system, in accordance with yet another representative embodiment.
Figure 19B:
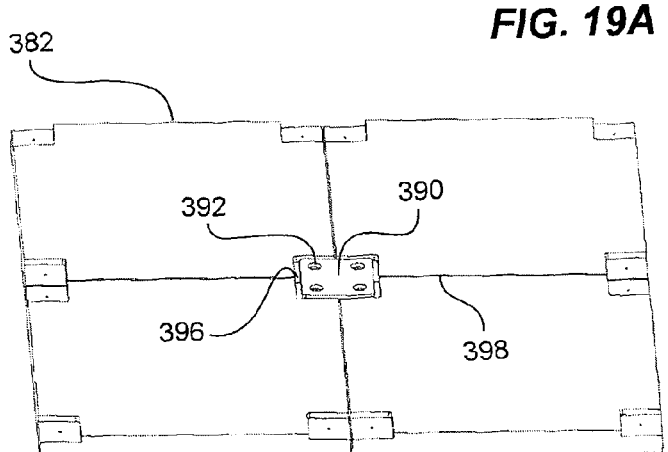

FIGS. 19A-19B illustrate yet another representative embodiment of the modular sub-flooring system 380 that utilizes corner bridge connectors 390 to assemble the sub-floor tiles 382 together. In this embodiment, for instance, the first connection interface 384 formed into the corners of the sub-floor tiles can comprise a square corner recess 386 having an attachment hole 388, such as threaded hole, in the center of the recess for receiving a fastener. When multiple sub-floor tiles 382 are assembled together the square corner recesses 386 can combine to create a larger square recess that is adapted to loosely receive the body of a bridge connector 390, leaving a first clearance gap 396 between the outer edges of the bridge connector and the interior edges of the larger square recess. The bridge connector can also have a plurality of thru-holes 392 formed therein which align with the attachment holes 388 below. The thru-holes can also have countersunk bearing surfaces interior to the holes which can be engaged by the head of a fastener (not shown).

During assembly of the sub-flooring system 380 (see FIG. 19B) fasteners can be inserted through the thru-holes 392 in the bridge connector 390 and into the attachment holes 388 below. However, the tips of the fasteners can contact the bottoms of the attachment holes prior to the heads of the fasteners rigidly engaging with the counter-sunk bearing surfaces, so as to create a non-rigid bridging interconnection 394 between the sub-floor tiles. Moreover, the positioning of the thru-holes can also be configured to establish a second clearance gap 398 between the sides of the sub-floor tiles upon assembly, so that the adjacent sub-floor tiles may experience controlled lateral movement without abutting against either the sides of the bridge connector 390 or against the sides of an adjacent sub-floor tile 382, and while still being restrained from moving vertically relative to the adjacent tiles.

As can be seen in the several embodiments described and illustrated above, a variety of first connection interfaces can be formed into the corners of the sub-floor tiles and coupled with various types of corner bridge connectors to form an assembled sub-flooring system. However, it is to be appreciated that the first connection interface is not restricted to the corner location, but may also be formed into the sidewalls or at any location around the periphery of the individual sub-floor tiles.

Figure 20:
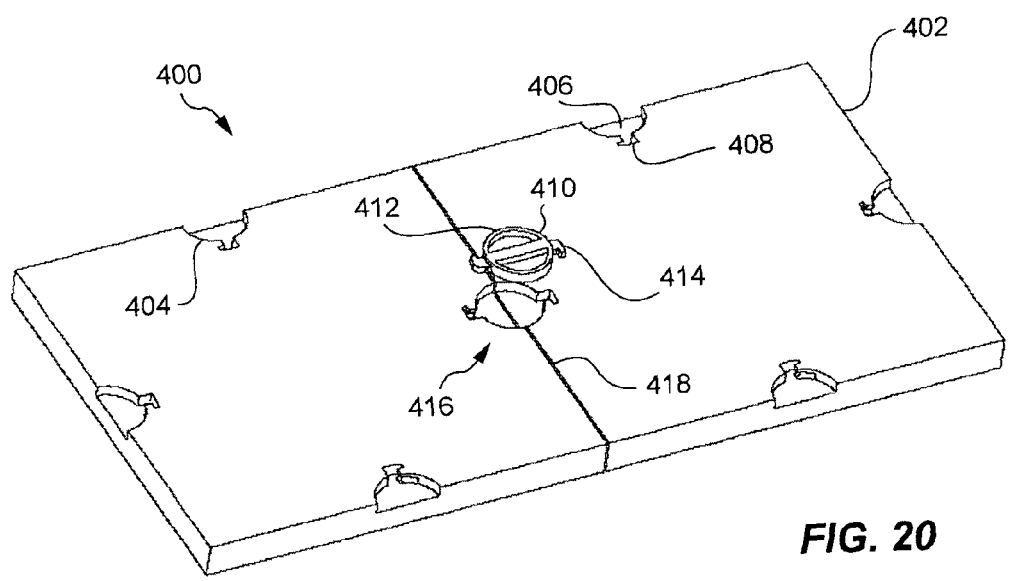
FIG. 20 is an exploded, perspective view of a modular flooring/sub-flooring system, in accordance with yet another representative embodiment.

Shown in the embodiment 400 of the modular sub-flooring system illustrated in FIG. 20, for instance, the first connection interface 404 can be formed or attached along the sidewalls of the sub-floor tiles 402 and configured to interconnect with a bridge connector 410. The first connection interface 404 can comprises a half-circle recess 406 and an access notch 408 and sub-surface engagement slot (not shown). With two sub-floor tiles positioned next to each other, the combined half-circle recesses 406 create a single circular recess adapted to receive the rounded body 412 of a twist-lock bridge connector 410 having hook tabs 414 that fit into the access notches 408. After insertion the bridge connector 410 can be rotated to engage the hook tabs into the sub-surface engagement slots and form a non-rigid bridging interconnection 416 that couples the sub-floor tiles 402 together.

Like the modular-sub flooring systems with corner tile connectors described above, the non-rigid bridging interconnection 416 of the modular sub-flooring system 400 shown in FIG. 20 can include enough internal lateral clearance within between the half-circle recesses and the round body 412 of the bridge connector 410 to allow controlled relative lateral movement while still restraining relative vertical movement between the sub-floor tiles 402. However, the sub-floor tiles may not include a second connection interface used to form an alignment interconnection. Instead, the sub-floor tiles may simply be placed next to each other so that the half-circle recesses 406 line up to form the single circular recess, and with sufficient clearance 418 between the sides of the sub-floor tiles to avoid encroaching on or limiting the controlled relative lateral movement provided by the bridging interconnection 416.

Figure 21A:
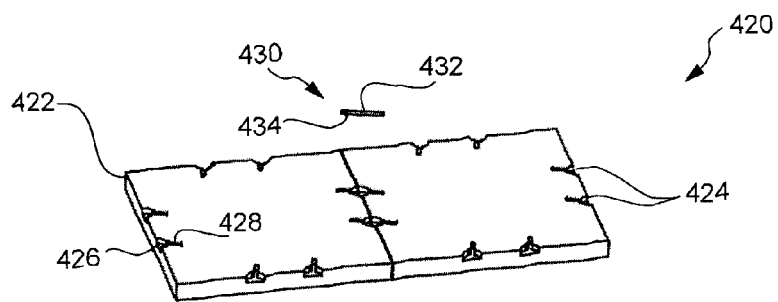
FIGS. 21A-21C together illustrate perspective views of a disassembled and assembled modular flooring/sub-flooring system, in accordance with yet another representative embodiment.
Figure 21B:
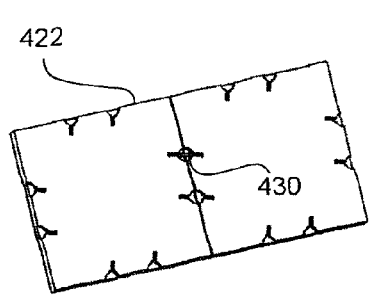
Figure 21C:
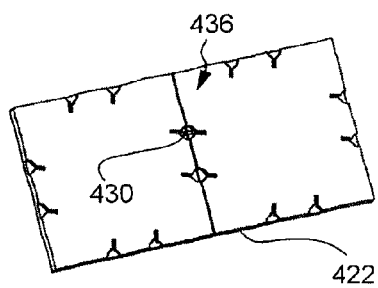

A bridging interconnection 436 having a different structure yet providing a similar performance can be seen in the modular sub-flooring system 420 of FIGS. 21A-21C. In this representative embodiment each sub-floor tile 422 can have two first connection interfaces 424 equally spaced apart along the sidewalls of the tile. Each connection interface 424 can comprise a small half-circle recess 426 with a diagonal access notch 428 and interior engagement slot (not shown). With two sub-floor tiles positioned next to each other, the combined half-circle recesses 426 create a single circular recess adapted to receive the elongated body 432 of a straight pin bridge connector 430, the ends 434 of which fit into the access diagonal notches 428.

After insertion into the connection interface 424 the bridge connector 430 can be rotated (see FIG. 21C) to engage the ends 434 of the pin with the interior engagement slots and establish the non-rigid bridging interconnection 436 that restrains the relative vertical movement between the sub-floor tiles 422. Furthermore, the elongated bodies 432 of the straight pin bridge connectors 430 can be provided in a length shorter than the internal diameter of the first connection interface's 424 engagement slots to facilitate the controlled relative lateral movement between the sub-floor tiles 422.

Figure 22:
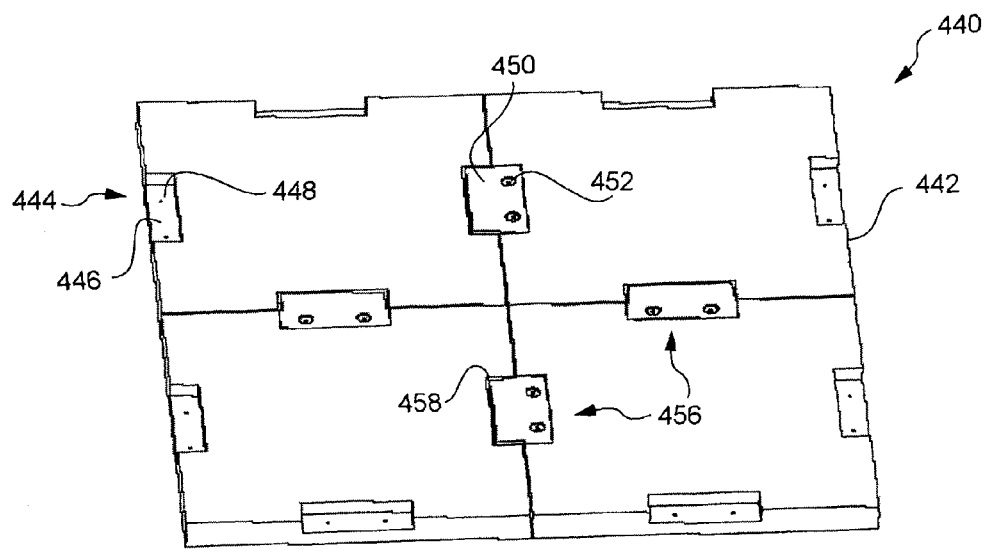
FIG. 22 is a perspective view of a modular flooring/sub-flooring system, in accordance with yet another representative embodiment.

Illustrated in FIG. 22 is yet another embodiment 440 of a modular sub-flooring system using a first connection interface 444 that can be formed or attached along the sidewalls of the sub-floor tiles 442. The first connection interface 444 can comprise a rectangular recess 446 having a pair of attachment holes 448, such as threaded holes, located within the recess for receiving a fastener. With two sub-floor tiles 442 positioned together the rectangular recesses 446 can combine to create a larger rectangular recess that is adapted to loosely receive the body of a tile connector 450.

Using a pair of thru-holes 452 formed into the tile connector that align with one pair of attachment holes 448 below, one side of the tile connector can be secured with fasteners (not shown) into the rectangular recess (e.g. the first connection interface) of one sub-floor tile while the other side loosely projects into the rectangular recess of the adjacent sub-floor tile. This can creates a tile interconnection 456 that, unlike the bridging interconnections described above, restrains the relative vertical movement between the sub-floor tiles 442 in one direction only. However, with tile connectors 452 alternately secured to any sub-floor tile and its adjacent sub-floor tiles and across all four sidewalls, the plurality of tile interconnections 456 can tend to restrict relative vertical motion in both directions. Moreover, if two first connection interfaces 444 are formed into the same edge, and with two tile connectors 450 spanning the same edge being alternately secured to either sub-floor tile and projecting into the rectangular recesses of the other (not shown), the two tile interconnections 456 will operate together to restrain relative vertical motion between the sub-floor tiles in both directions.

The size of the tile connectors 450 relative to the size of the rectangular recesses 446 forming the first connection interface 444 can also be configured to establish a first clearance gap 458 between the outer edges of the bridge connector and the interior edges of the recess, thereby facilitating controlled lateral movement between the sub-floor tiles.

Shown in FIGS. 23A-23B is a modular sub-flooring system 460 in accordance with yet another representative embodiment, which sub-flooring system also uses a first connection interface 464 that can be formed or attached to the sidewalls of the sub-floor tiles 462. As shown in FIG. 23A, the first connection interface 464 can comprise a plurality of elongated upwardly-opening edge pockets 466 extending along the length of two adjacent edges of the sub-floor tile. The edge pockets can have one or more transverse slots 468 periodically cutting across the long axis of the pockets 446. The edge pockets 466 can receive a complimentary interface 474 comprising a plurality of downwardly-projecting edge skirts 476 formed or attached to the sidewalls of an adjacent tile, as shown in FIG. 23B. Like the edge pockets, the edge skirts can extend along the length of each sidewall and can include one or more transverse bars 478 periodically projecting outwardly from the skirts.

During assembly, the transverse bars 478 can align with the transverse slots 468 to laterally locate the sub-floors tiles 462 relative to each other, and allow the edge skirts 476 of one sub-floor 462 tile to be inserted into the edge pockets 466 of one or more adjacent sub-floor tiles positioned over the ground surface. Furthermore, the size of the skirts 476 relative to the size of the pockets 466 can be configured to establish a lateral clearance gap between the outer surfaces of the skirts and the interior edges of the pockets, thereby facilitating controlled lateral movement between the sub-floor tiles.

A bridging interconnection 494 having a yet different structure than those described and illustrated above, but which still provides a similar performance for restraining relative vertical movement while facilitating controlled lateral movement between adjacent sub-floor tiles, can be seen in the modular sub-flooring system 480 of FIG. 24. For instance, each sub-floor tile 482 can have two first connection interfaces, namely interior passages 484 and 486 running perpendicular to each other through a plurality of supporting ribs 488, and which are also located one above the other. The connection interfaces in adjacent sub-floor tiles can align to form extended interior passages traversing multiple sub-floor tiles. Bridging tile connectors in the form of solid elongated rods 490, 492 can be threaded in both directions through the extended interior passages 484, 486, and thereby loosely couple the sub-floor tiles in the lateral plane while restricting relative motion in the vertical direction.

Figure 25:
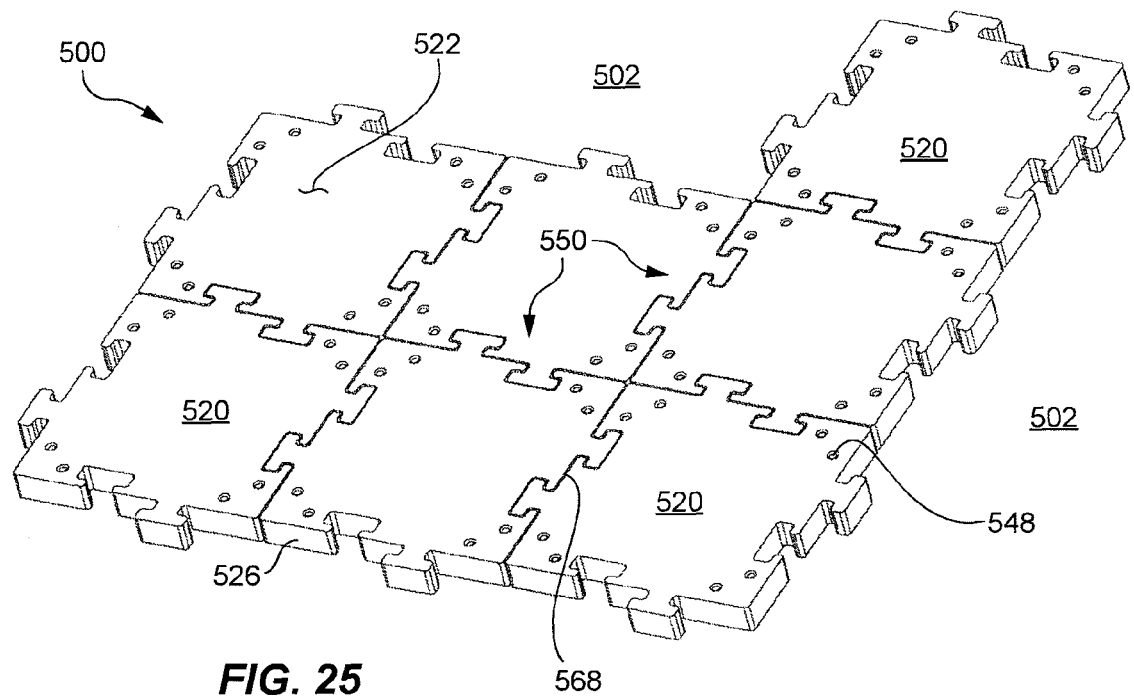
FIG. 25 is a perspective view of a modular flooring/sub-flooring system, in accordance with another representative embodiment.
Figure 26:
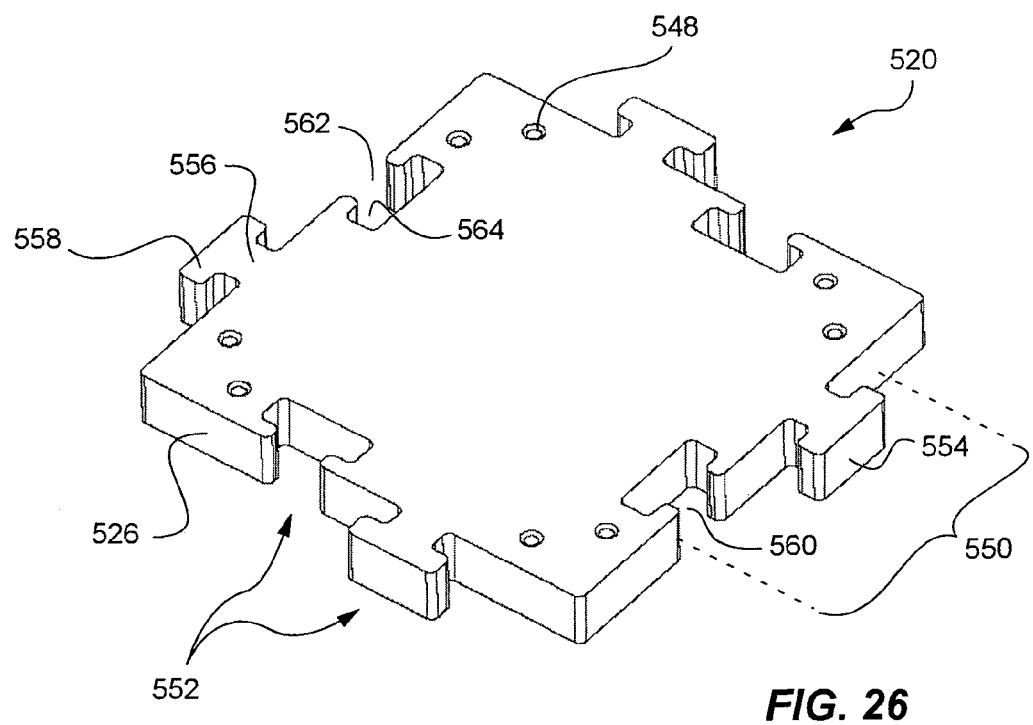
FIG. 26 is a perspective view of a modular floor/sub-floor tile; in accordance with the embodiment of FIG. 25.

Illustrated in FIG. 25 is a modular sub-flooring system 500 in accordance with yet another representative embodiment, and which sub-flooring system comprises a plurality of modular, synthetic sub-floor tiles 520 which are assembled together over a ground surface 502 with a plurality of interrelating side connection interfaces 550. The side connection interfaces 550 can operate to align the sub-floor tiles relative to one another during assembly along a vertical axis while allowing for the controlled relative lateral movement between the sub-floor tile during use. For example, as shown in more detail in FIGS. 26 and 27A-27C, the side connection interface 550 can comprise a pair of complimentary puzzle pieces 552 that includes a T-shaped, outwardly-projecting tab 554 (comprising a crosspiece 558 attached to a neck 556) and a corresponding T-shaped, inwardly-extending cut-out 560 (defined by a gap 562 leading to a cross-slot 564). Pairs of puzzle pieces can be formed into each sidewall 526 of the sub-floor tile 520, and can slide vertically into matching pairs of puzzle pieces formed into the adjacent sub-floor tiles during assembly of the modular sub-flooring system. While generally formed into the shape of a "T" bar and a "T" slot, respectively, the tabs 554 and cut-outs 560 can comprise a variety of shapes and sizes, and are not restricted or limited to the shapes and sizes shown in the drawings.

The interconnecting puzzle pieces 552 can be sized so that the tabs 554 fits loosely within the cut-outs 560 to maintain the side clearance gap 568 between the sidewalls 526 and side connection interfaces 550 of the sub-floor tiles 520 (see FIG. 25). The side clearance gap can provide for the thermal expansion and contraction of the individual sub-floor tiles with their own footprints and without binding against the sidewalls of an adjacent tile. In a representative embodiment, the side clearance gap can range from 1/16 inch up to and including 5/16 inch, and may vary along the sides of the sub-floor tile. For instance, the clearance gap between outer walls of the tabs 554 and the inner walls of the cut-outs 560 may be greater or less than the clearance gap between adjacent sidewalls 526, it so desired.

As an additional benefit, the clearance gap 568 separating the sub-floor tiles 520 can also provide a drainage path to ground for rainwater and other liquids which may flow downwards from a permeable overlayment, such as a synthetic sports flooring configuration with a porous upper surface. The clearance gap can also provide a limited volume for the temporary storage of the rainwater until it can evaporate or be absorbed by the ground surface. Drain holes 548 formed through the top surfaces 522 of the sub-floor tiles 520 can also provide drainage paths to the underlying ground surface.

Figure 28:
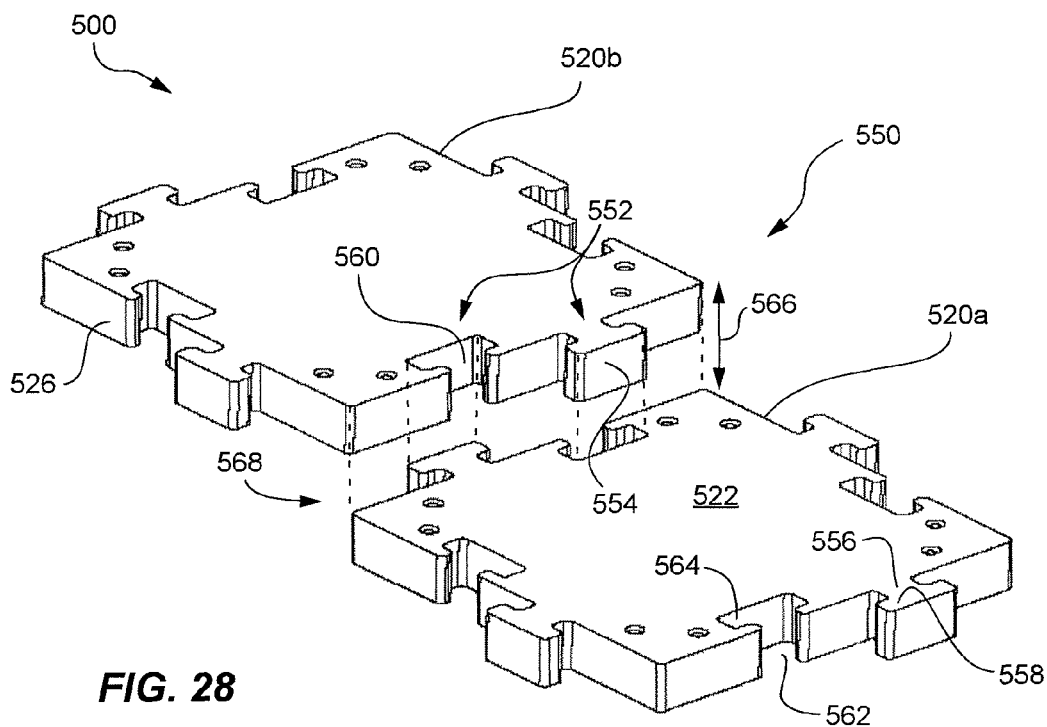
FIG. 28 is an exploded perspective view of the side connection interface; in accordance with the embodiment of FIG. 25.

Illustrated in FIG. 28 is a method for assembling (or disassembling) one sub-floor tile 520a to an adjacent sub-floor tile 520b along a vertical axis, to respectively create (or break) the non-rigid side interconnection that substantially aligns the sub-floor tiles together over the ground surface. Specifically, the side connection interfaces 550 of each sub-floor tile can slide into or out of the side connection interfaces of the adjacent sub-floor tiles with only a vertical motion component 566, or without a horizontal motion component, so that any individual sub-floor tile can be attached or removed from the sub-flooring system 500 without laterally displacing the adjacent sub-floor tiles. To facilitate assembly along a vertical axis, the top surface 522 of any sub-floor tile 520 can be configured to not extend over a bottom surface an adjacent sub-floor tile and so prevent the vertical removal of the adjacent sub-floor tile. Stated differently, the side connection interface 550 can be configured so that a lower edge portion of any sub-floor tile is not be overlaid by an upper edge portion of an adjacent sub-floor tile.

Figure 29A:
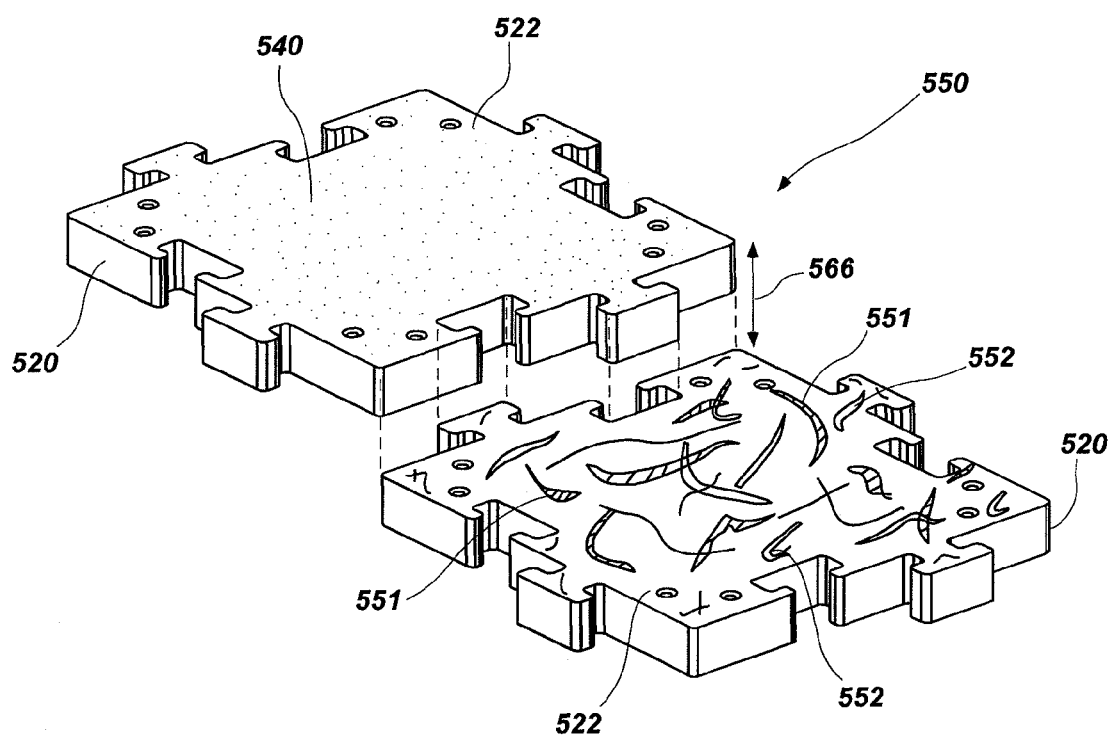
FIG. 29A-29B is a perspective view of modular flooring/sub-flooring tiles according to one embodiment of the invention.
Figure 29B:
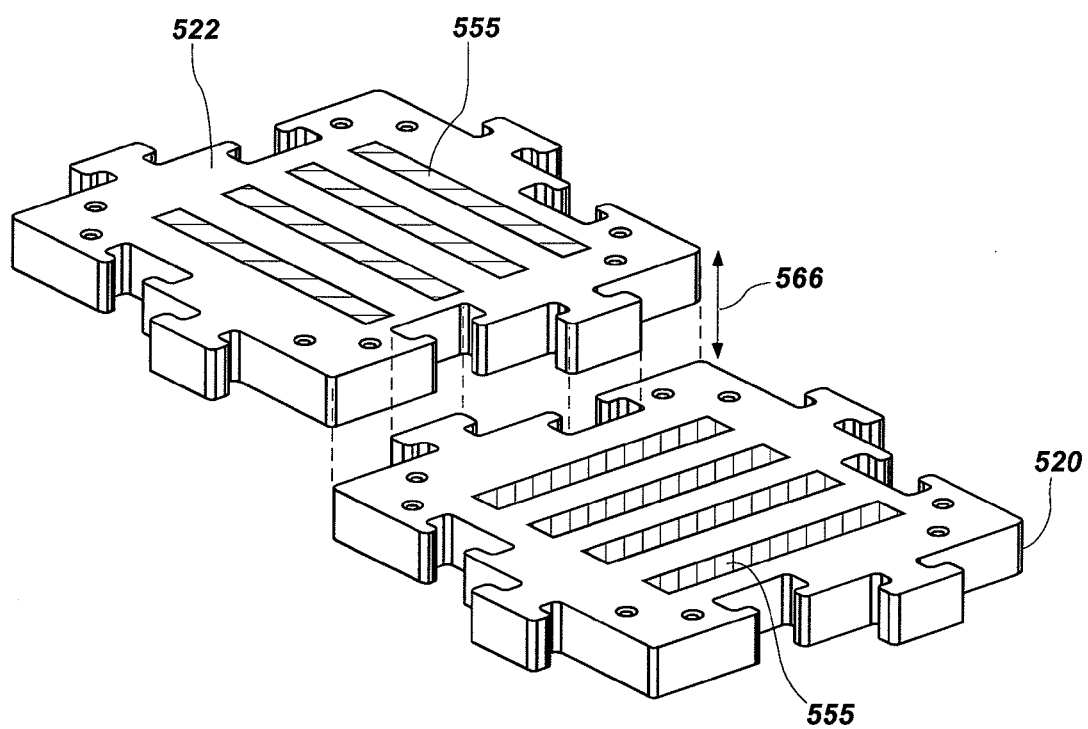

With reference now to FIGS. 29A and 29B, what has been referred to herein as a sub-floor is shown as a primary flooring surface. As with the tiles of FIG. 28, the side connection interfaces 550 of floor tile can slide into or out of the side connection interfaces of the adjacent floor tiles with only a vertical motion component 566, or without a horizontal motion component, so that any individual floor tile can be attached or removed from the flooring system 500 without laterally displacing the adjacent floor tiles. To facilitate assembly along a vertical axis, the top surface 522 of any floor tile 520 can be configured to not extend over a bottom surface an adjacent floor tile and so prevent the vertical removal of the adjacent floor tile. In one aspect of the invention, the top surface 522 of the floor tile is modified to enhance traction atop the tile.

Methods of surface modification include after-mold coating, mechanical abrasion, or molded texturing. In one aspect of the invention, shown on FIG. 29A, a spray-on coating is applied to the surface of a tile after it is removed from the mold. Abrasive surfaces with high static coefficients of friction range, in one embodiment, generally from 0.57 to 0.60. In another aspect, a medium abrasive surface would have a static coefficient of friction ranging generally from 0.53 to 0.57. In still another embodiment, a low coefficient of friction may be appropriate ranging generally from 0.50 to 0.53.

A top surface 522 of the tile may be subjected to mechanical abrasion creating grooves 550 and/or protrusions 551 raised off of the surface 522 of the tile. The grooves 550 and protrusions 551 may be variable across the surface of the tile or may be disposed in a repeating pattern. Advantageously, the top surface 522 of the tile provides for enhanced traction which may be useful if the tile is used as a primary flooring surface. Alternatively, if the tile is used as a sub-floor, the enhanced traction assists in limiting movement of a primary floor overlaid the sub-floor without securing the primary floor to the sub-floor. In this manner, where the primary floor comprises a plurality of interconnected tiles, sudden movements on the surface of the primary floor will not disconnect interconnected tiles as there is some give between the primary floor and the sub-floor. However, there is sufficient friction to minimize substantial lateral movement of the primary floor atop the surface of the sub-floor.

In yet another aspect of the invention, molds for the tiles themselves may be configured such that grooves and/or protrusions 555 are created on the surface of the tile to enhance traction. The protrusions 555 may be oriented in a randomized manner or may be disposed in a specific pattern as shown on FIG. 29B. While the above referenced surface modifications have been shown with an example tile (FIG. 28), it is understood and contemplated herein, that the surface modifications could be used with any tile including, but without limitation, all of the tiles shown and described in this application.

Figure 30:
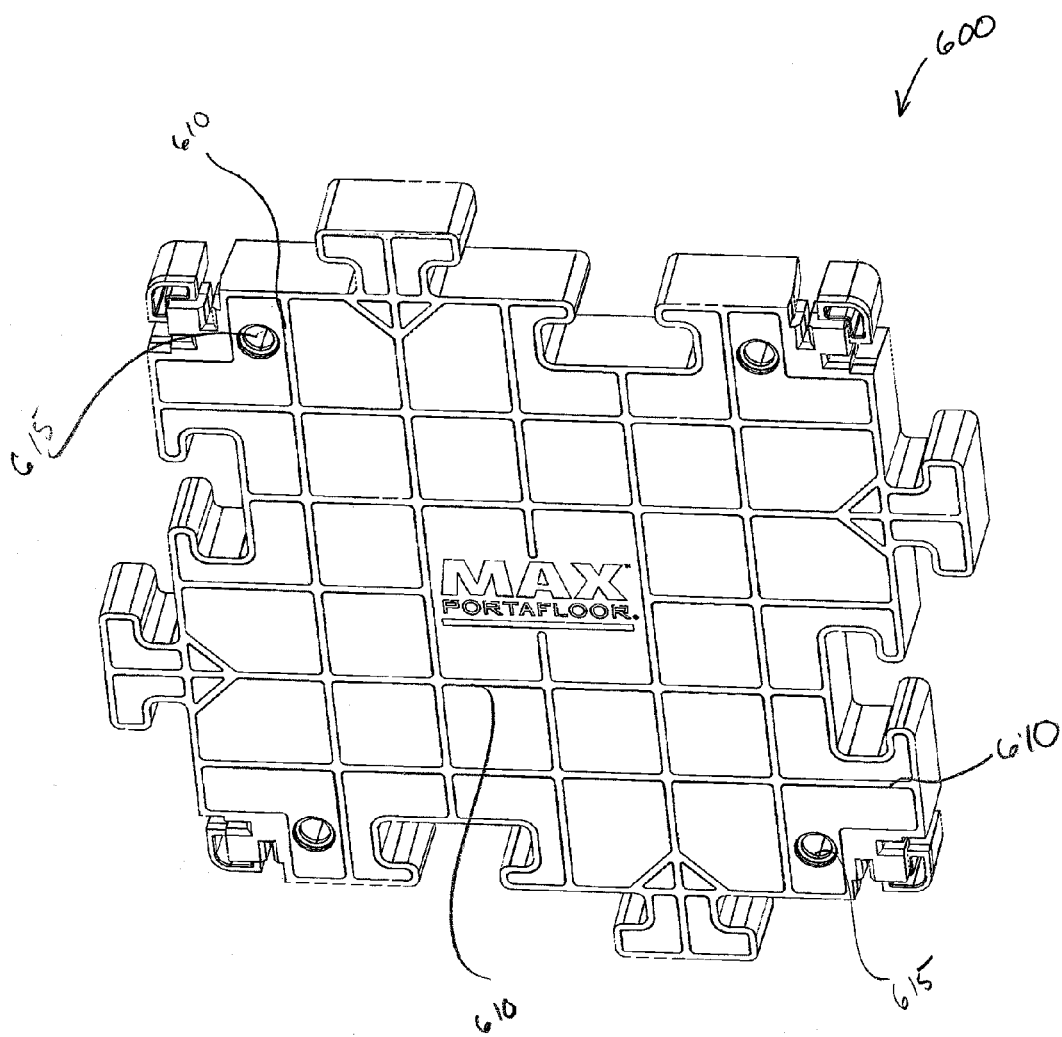
FIG. 30 is a top perspective view of a modular flooring/sub-flooring tile according to one embodiment of the invention.
Figure 31:
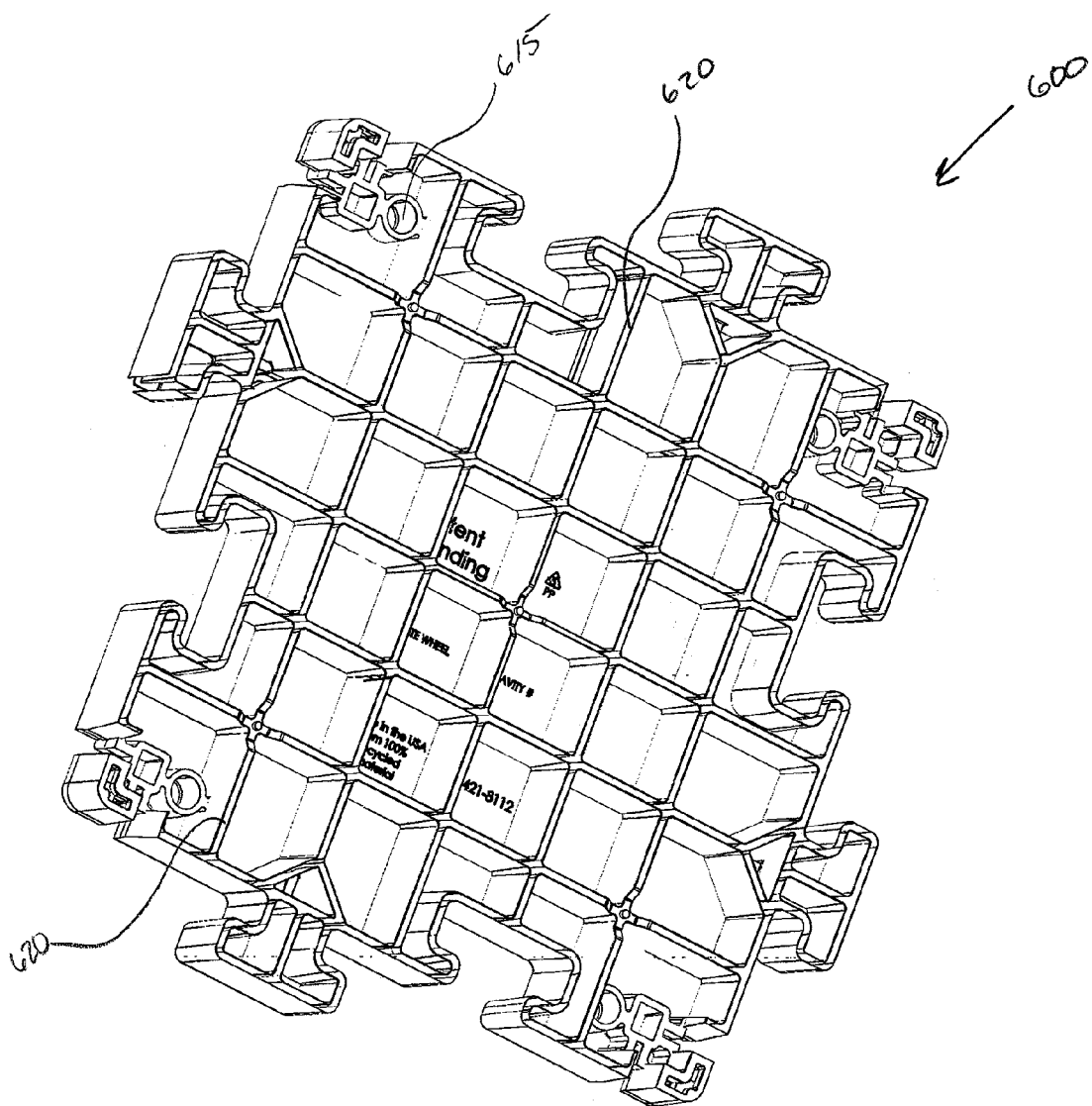
FIG. 31 is a bottom perspective view of the modular flooring/sub-flooring tile of FIG. 30.

Referring now to FIGS. 30 and 31, in an additional embodiment of the present invention, modular floor tile 600 is shown. In one aspect of the invention, the top surface comprises a plurality of recessed grooves 610 that provide drainage channels for fluids as well as enhanced traction about the top surface of the tile. A hole 615 is provided on each corner of the tile which is counter-sunk to provide space for an anchoring bolt or other securing device while providing for a substantially planar upper surface. In accordance with one aspect of the invention, the support ribs 620 taper from the top of the tile to the bottom.

Figure 32:
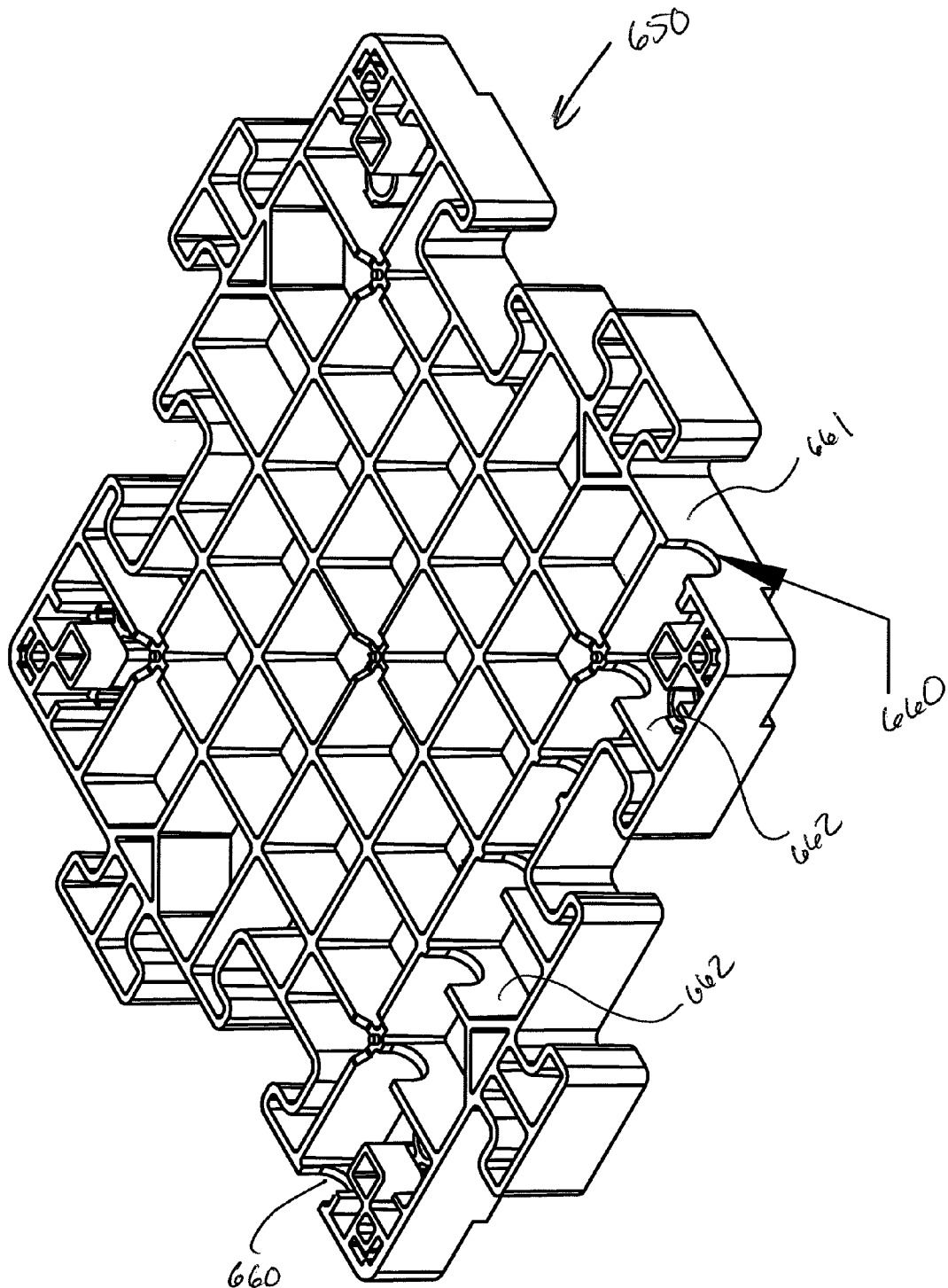
FIG. 32 is a bottom perspective view of a modular flooring/sub-flooring tile in accordance with one embodiment of the invention.

Referring now to FIG. 32, in an additional embodiment of the invention, a modular flooring tile 650 is shown. A channel 660 is disposed through the sidewalls 661 and support ribs 662 of the tile 650. The channel 660 is disposed within the tile 650 to facilitate the placement of conduits (electrical or otherwise) beneath the flooring system in an area that is not at the interface between adjacent tiles as discussed in preceding sections of this document. The channel 660 may be oriented perpendicular to the side walls 661 of the tile or alternatively in a non-parallel orientation as suits a particular application.

As noted in preceding sections of this application, any of the tile configurations disclosed herein may be used as a primary flooring component as well as a sub-floor as suits a particular application. For example, in some situations, it may be desirable to have a rigid, durable, primary modular flooring system with the benefits and advantages associated with the sub-floor described herein. For example, it may be desirable to have a rigid modular flooring system for use as a temporary parking strip for heavy machinery. It may not be desirable to install a more permanent surface (such as a concrete surface) that would otherwise be necessary to properly store and maneuver such objects and smaller, less rigid primary flooring configurations would not function as desired. The rigid flooring system described herein (see e.g., FIGS. 2-12 and 16-31) would be used as a primary flooring component for such an application. Of course, any other suitable application that would require a rigid modular floor is also contemplated herein.

Advantageously, the rigid, relatively thick construction of the tile configurations disclosed herein are useful for the outdoor storage of items with a high payload. It is believed that the tiles described herein are capable of withstanding loads as high as 80,000 pounds per square foot without plastic deformation of the tiles. Additionally, as described above and shown in the attendant figures, the understructure of the tiles comprises a plurality of cavities ranging in width from 1 to 4 inches in width. The cavities provide an "auto-leveling" function in that minor irregularities in the surface over which tiles are placed can be contained within the cavities. In this manner, the top surface of the tiles remains planar even in areas where the sub-base is not.

While various representative embodiments of a modular flooring and sub-flooring system have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, steps recited in the method or process claims may be executed in any order and are not limited to the order presented in the claims. Accordingly, the scope of the invention should be determined solely by the appended claims and their legal equivalents, rather than by the descriptions and examples given above.

What is claimed and desired to be secured by Letters Patent is:

1. A modular flooring system comprising:
   a plurality of four rigid floor tiles disposed adjacent one another at a common corner junction, the plurality of tiles forming a substantially flat top surface;
   a pocket disposed about a corner of the floor tile; and
   at least one corner bridge connector coupled between the floor tiles, wherein the corner bridge connector comprises a top member and a bottom member secured together by a fastener and wherein the bottom member comprises four upwardly-extending members configured to mate with a bottom portion of each of the four tiles and wherein the top member comprises a center body with four arms extending laterally away from the center body.

2. The flooring system of claim 1, wherein the controlled relative lateral movement between the floor tiles ranges from about 1/16 inch to about 3/16 inch and facilitates thermal expansion and contraction of each floor tile within its own footprint.

3. The flooring system of claim 1, wherein the corner bridge connector is received within a plurality of recessed regions formed into the floor tiles with a top surface of the bridge connector flush or below the top surfaces of the floor tiles.

4. The flooring system of claim 1, wherein the at least one corner bridge connector comprises a corner bridge connector coupled across a corner junction of a plurality of floor tiles and is fastened together through a center portion of the top and bottom members.

5. The flooring system of claim 4, wherein the bridge connector comprises an L-shaped skirt extending downward from the connector.

6. The flooring system of claim 1, wherein each floor tile further comprises at least one drain hole through the top surface near a corner of the floor tile that facilitates drainage.

7. The flooring system of claim 1, wherein the top surface of any floor tile further comprises a plurality of randomly distributed raised protrusions.

8. A modular flooring system comprising:
   a rigid first floor tile having a first substantially flat top surface;
   a rigid second floor tile adjacent the first floor tile and having a second substantially flat top surface;
   at least one removable corner bridge connector coupled between the first and second floor tiles, wherein the corner bridge connector comprises a top member and a bottom member secured together by a fastener, the bottom member comprising at least two upwardly-extending members configured to be disposed within a bottom of the floor tiles and the top member comprising a center body with arms extending laterally away from the center body and a plurality of skirts extending downward from the center body and the arms, wherein the skirts mate with a corner pocket formed in a corner of each of the tiles.

9. The modular flooring system of claim 8, further comprising third and fourth floor tiles coupled to the first and second floor tiles, wherein the corner bridge connector is disposed across a corner of each of the first, second, third, and fourth tiles.

10. The modular flooring system of claim 8, wherein the bridge connector comprises a vertically oriented engagement member extending downward from the bridge connector.

11. A modular floor tile assembly, comprising:
- a plurality of four rigid floor tiles disposed adjacent one another at a common corner junction, the plurality of tiles forming a substantially flat top surface;
- a pocket disposed about a corner of the floor tile; and
- at least one corner bridge connector coupled between the floor tiles at the common corner junction, wherein the bridge connector permits relative lateral movement and restrains relative vertical movement between the floor tiles, while maintaining a substantially smooth top surface alignment across adjacent corners of the top surfaces of the tiles;
- wherein the corner bridge connector comprises a top plate and a bottom plate secured together by a fastener and wherein the bottom plate comprises four upwardly-extending members configured to mate with a bottom of each of the four tiles, and wherein the top plate comprising a center body with four arms extending laterally away from the center body and a plurality of four skirts, wherein each skirt extends downward from the center body and two of the arms and wherein the skirts mate with a corner pocket formed in a corner of each of the tiles.

12. The modular floor tile assembly of claim 11, wherein the top plate comprises a circular recess about the center of the top plate.

13. The modular floor tile assembly of claim 11, wherein the bottom plate comprises a central upwardly-extending member disposed in the center of the bottom plate.

14. The modular floor tile assembly of claim 13, wherein the central upwardly-extending member is adapted to mate with a central downwardly-extending member disposed in the center of the top plate.

15. The modular floor tile assembly of claim 14, further comprising a fastener disposed through the central upwardly-extending member in the bottom plate and the central downwardly-extending member of the top plate.

16. The modular floor tile assembly of claim 13, wherein the central upwardly-extending member comprises a cylinder.

17. The modular floor tile assembly of claim 16, wherein the central upwardly-extending member is disposed in an aperture defined by a space between the corners of the four tiles at the common corner junction.

* * * * *